(12) United States Patent
Slonneger

(10) Patent No.: US 9,442,570 B2
(45) Date of Patent: Sep. 13, 2016

(54) METHOD AND SYSTEM FOR GESTURE RECOGNITION

(71) Applicant: Motorola Mobility LLC, Libertyville, IL (US)

(72) Inventor: Andrew M Slonneger, Crystal Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 157 days.

(21) Appl. No.: 13/800,743

(22) Filed: Mar. 13, 2013

(65) Prior Publication Data

US 2014/0282270 A1 Sep. 18, 2014

(51) Int. Cl.
G06F 3/02 (2006.01)
G06F 3/01 (2006.01)

(52) U.S. Cl.
CPC .................................... G06F 3/017 (2013.01)

(58) Field of Classification Search
USPC .......................... 345/156, 173, 169; 715/863
See application file for complete search history.

(56) References Cited

U.S. PATENT DOCUMENTS

| | | | |
|---|---|---|---|
| 6,151,208 A | 11/2000 | Bartlett | |
| 6,874,127 B2 | 3/2005 | Newell et al. | |
| 7,180,502 B2 | 2/2007 | Marvit et al. | |
| 7,184,025 B2 | 2/2007 | Williams et al. | |
| 8,280,732 B2 | 10/2012 | Richter et al. | |
| 8,344,998 B2 | 1/2013 | Fitzgerald et al. | |
| 8,515,505 B1 | 8/2013 | Pattikonda | |
| 8,784,271 B2 | 7/2014 | Brumback et al. | |
| 8,819,569 B2 | 8/2014 | SanGiovanni et al. | |
| 9,009,516 B1 | 4/2015 | Gabayan et al. | |
| 2008/0174547 A1 | 7/2008 | Kanevsky et al. | |
| 2008/0192005 A1 | 8/2008 | Elgoyhen et al. | |
| 2008/0255795 A1 | 10/2008 | Shkolnikov | |
| 2008/0291160 A1 | 11/2008 | Rabin | |
| 2009/0265671 A1 | 10/2009 | Sachs et al. | |
| 2010/0138785 A1 | 6/2010 | Uoi et al. | |
| 2011/0054833 A1 | 3/2011 | Mucignat | |
| 2011/0177802 A1 | 7/2011 | Gupta | |
| 2011/0310005 A1* | 12/2011 | Chen ..................... G06F 1/3203 345/156 |

(Continued)

FOREIGN PATENT DOCUMENTS

| | | |
|---|---|---|
| EP | 2079004 A1 | 7/2009 |
| EP | 2499552 A1 | 9/2012 |

OTHER PUBLICATIONS

International Search Report and Written Opinion of international application No. PCT/US2014/015187, dated May 23, 2014, 10 pgs.

(Continued)

*Primary Examiner* — Thuy Pardo
(74) *Attorney, Agent, or Firm* — Shumaker & Sieffert, P.A.

(57) ABSTRACT

A method and system for recognizing gestures on an electronic device, such as a mobile device (e.g., watch), are disclosed. In one example embodiment, the method includes obtaining a gesture template, determining a first mean value based upon the gesture template, obtaining gesture data by way of a motion sensing component of the electronic device, and calculating (by way of a processing device) a correlation metric based at least indirectly upon the gesture data and the gesture template, where the correlation metric is calculated based at least in part upon the first mean value. The method also includes determining based at least in part upon the correlation metric that a first of the gestures has occurred, and taking at least one additional action based at least in part upon the determining.

20 Claims, 11 Drawing Sheets

(56) References Cited

U.S. PATENT DOCUMENTS

| | | | |
|---|---|---|---|
| 2012/0016641 A1* | 1/2012 | Raffa | G06F 1/1694 703/2 |
| 2012/0254646 A1 | 10/2012 | Lin | |
| 2012/0272194 A1* | 10/2012 | Yang | G06F 3/017 715/863 |
| 2012/0297226 A1 | 11/2012 | Mucignat et al. | |
| 2013/0222270 A1 | 8/2013 | Winkler et al. | |
| 2013/0222271 A1 | 8/2013 | Alberth et al. | |
| 2013/0249785 A1 | 9/2013 | Alameh | |
| 2013/0265218 A1* | 10/2013 | Moscarillo | 345/156 |
| 2013/0300687 A1 | 11/2013 | Park | |
| 2014/0071037 A1* | 3/2014 | Cohen | G06K 9/00348 345/156 |
| 2014/0139454 A1* | 5/2014 | Mistry et al. | 345/173 |
| 2014/0191955 A1* | 7/2014 | Raffa | G06F 1/1694 345/156 |
| 2014/0253429 A1* | 9/2014 | Dai et al. | 345/156 |
| 2014/0282270 A1 | 9/2014 | Slonneger | |

OTHER PUBLICATIONS

Wikipedia, "Covariance", http://en.wikipedia.org/wiki/Covariance, accessed Mar. 13, 2013, 6 pages.

Wikipedia, "Pearson Product-Moment Correlation Coefficient", http://en.wikipedia.org/wiki/Pearson_product-moment_correlation_coefficient, accessed Mar. 13, 2013, 13 pages.

Wikipedia, "Correlation and Dependence", http://en.wikipedia.org/wiki/Correlation_and_dependence#Pearson.27s_product-moment_coefficient, accessed Mar. 13, 2013, 8 pages.

International Preliminary Report on Patentability from International Application No. PCT/US2014/015187, mailed Sep. 24, 2015, 8 pp.

Fareastgizmos, Casio G-Shock with High Brightness LED Automatically Illuminates the Display When the User Tilts the Watch Toward the Eyes to Check the Time—Fareastgizmos, 3 pages, downloaded from fareastgizmos.com, downloaded on Jan. 7, 2014.

Introducing the Meteor Your Voice and Gesture-Controlled Smartwatch, Two-Way Voice & Gesture Control Communicator, Kreyos—The Meteor smart watch, downloaded from https://kreyos.com/, downloaded on Jun. 3, 2014, 8 pages.

Shanklin, "Review: Pebble Smartwatch", www.gizmag.com/pebble-watch-review/28990, Sep. 8, 2013, 11 pages, downloaded on Jan. 7, 2014.

Jon Fingas, "Android Wear will reportedly let you navigate with a flick of the wrist," Engadget, Retrieved from <http://www.engadget.com/2015103/10/androidweargestureandwifileak/> Mar. 10, 2015, 19 pp.

* cited by examiner

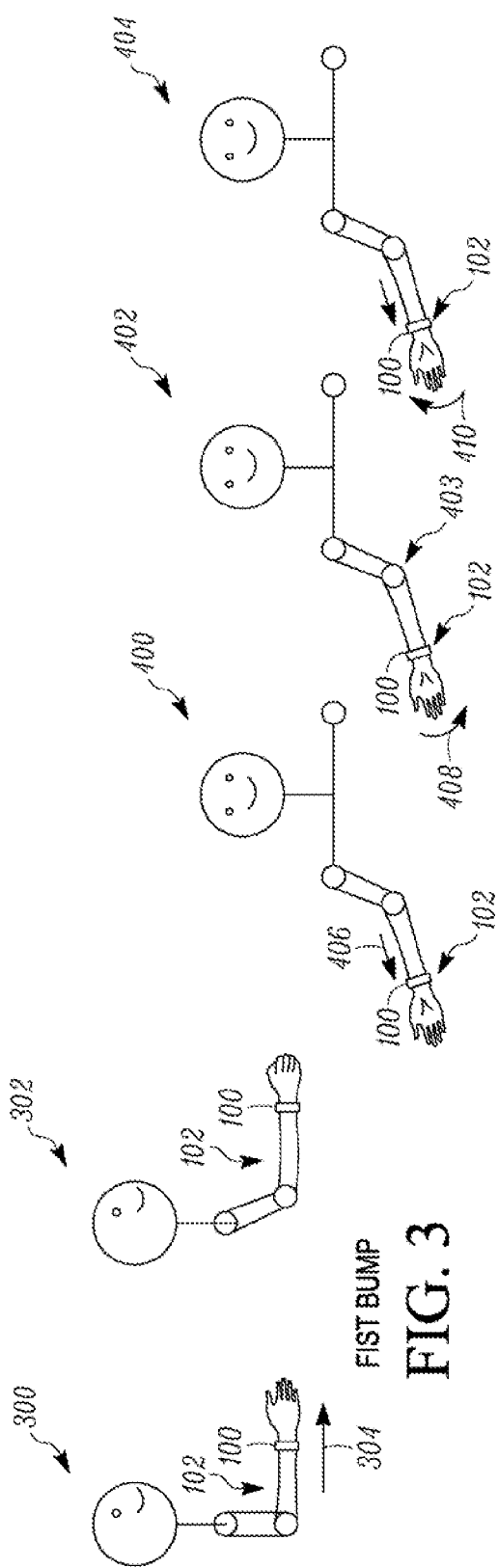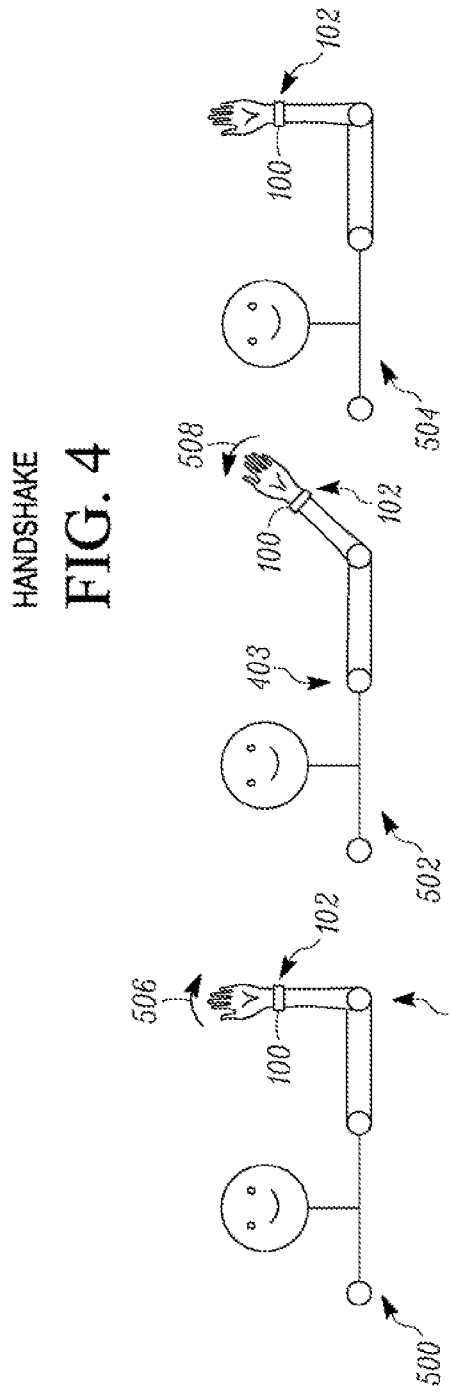

METHOD AND SYSTEM FOR GESTURE RECOGNITION

FIELD OF THE DISCLOSURE

The present disclosure relates to electronic devices such as mobile devices and, more particularly, to methods and systems for recognizing or facilitating the recognition of gestures at or in relation to such electronic devices.

BACKGROUND OF THE DISCLOSURE

Mobile devices such as smart phones, tablet computers, and gaming controllers increasingly include capabilities for recognizing accelerometer-based gestures. An electronic device held by or mounted upon the user (or a body portion thereof) senses movements of the body that can be detected by the electronic device and recognized as a gesture. Gesture recognition in electronic devices is becoming of increasing importance insofar as gestures (and recognition of gestures) can provide a natural, immediate, intuitive manner of inputting commands or signals to an electronic device that can serve to initiate, activate, or trigger functionality of the electronic device or otherwise have an influence on the electronic device.

Notwithstanding the value and increasing importance of gesture recognition in relation to a wide variety of electronic devices, it remains difficult in many contexts for electronic devices to recognize that gestures have occurred or to recognize exactly what gestures have occurred even if some gesture-like behavior has been detected. First, gestures can be difficult to recognize because, even though a given type of gesture involves characteristic movements, any given performance of the gesture will typically vary from other performances of the gesture. Thus, successful gesture recognition requires that the recognition mechanism not only be capable of distinguishing intended gesture movements from other movements, but also be tolerant of variations in the movement associated with different instances of that given type of gesture so that those different instances can all be recognized as gestures of that given type.

Further, in embodiments where gestures are to be sensed as movements by way of accelerometers or gyroscope signals, the proper recognition of gestures can be impeded by imperfect or inaccurate operation of the accelerometers (or other sensors, such as gyroscopes), or to the extent that the signals from such sensing devices include significant noise levels. Thus, there are opportunities to improve accelerometer-based gesture recognition within electronic devices.

BRIEF DESCRIPTION OF THE DRAWINGS

FIGS. 3-5 are schematic diagrams illustrating a fist bump gesture, a handshake gesture, and a handwave gesture, respectively;

DETAILED DESCRIPTION

Figure 1:
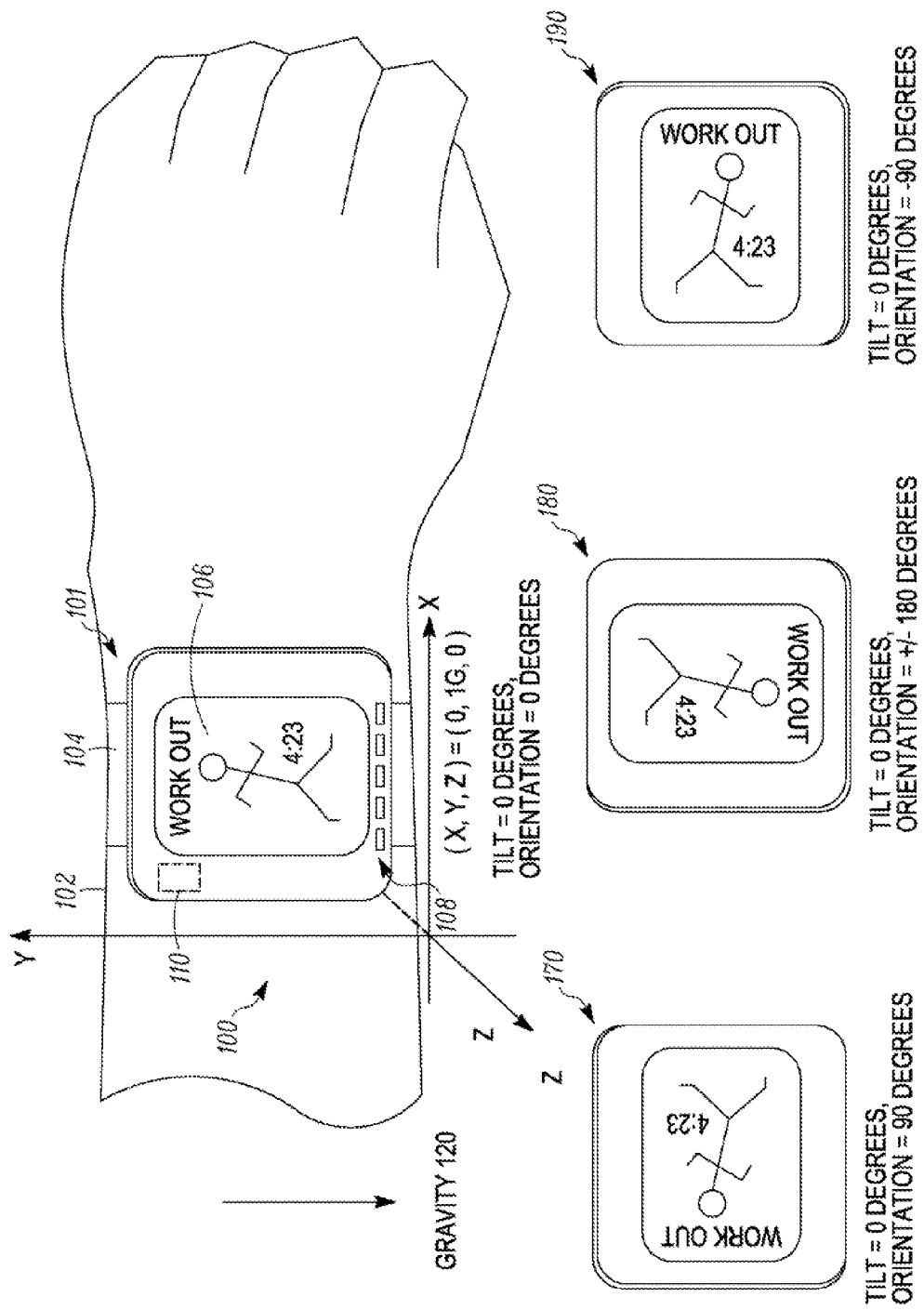
FIG. 1 shows in schematic form an example electronic device, which is configured to perform gesture recognition, positioned on a user's lower arm (shown in phantom) and in relation to example coordinate axes, and further shows the electronic device in three alternative tilt arrangements.

Embodiments described herein include, but are not limited to, methods or systems for recognizing gestures at or in relation to electronic devices, including mobile devices and personal electronic devices. In at least some embodiments, the methods or systems operate by determining score(s) regarding possible gesture inputs so that, rather than merely determining whether gestures have occurred, the methods or systems ascribe value(s) that represent a likelihood of whether a recognizable gesture has occurred upon receipt of gesture input data. By determining score(s) of this type (instead of merely making hard or binary decisions as to whether gestures have occurred), such methods or systems (a) reduce the costs associated with false negatives or false positives (in this regard, it should be understood that these costs can be understood to exist both at the level of gesture detection or algorithmic level, and also at a higher level that is the level of a user or the level of application(s) that operate based upon gesture detection), and also (b) allow for the gesture input data and score(s) representative thereof to be utilized in combination with other information such as information concerning a user's context (e.g., the user's location and/or cloud computing based context), which can further enable accurate gesture detection and/or make possible other enhancements to the operation of the electronic device.

Additionally, depending upon the embodiment, the methods and systems can employ any of a variety of metrics in determining or evaluating the score(s) regarding possible gesture inputs. In at least some embodiments, the methods and systems particularly employ one or more of correlation metrics and/or peak-to-peak (p2p) metrics based on sensor input. A correlation metric (or combinations of them) in some embodiments can be interpreted as a score or likelihood that a gesture occurred. Further, in some embodiments, comparing p2p metrics to thresholds (or to other peak-to-peak thresholds) aids in detecting a gesture. Also, for some sensor inputs, use of p2p metrics can replace needing to calculate a correlation metric. Additionally in some embodiments, a subset of possible correlation and p2p metrics is/are calculated and compared to threshold(s) to judge whether a gesture occurred. Further, in at least some embodiments, the methods and systems described herein operate at least in part by way of a state machine that is used to control algorithmic operations, and that can particularly serve to reduce algorithmic operations when implementing a given embodiment of this disclosure.

It is envisioned that methods and systems described herein can be utilized to recognize a variety of types of spatial gestures, in which movement of a user (or a body portion of the user) causes corresponding movement of the electronic device itself (e.g., because the electronic device is attached to the body portion), and the electronic device senses its own movement in space and thereby senses the gesture.

At least some embodiments described herein are particularly implemented at or in relation to electronic devices that are attached to the body portion of a user, such as a watch strapped to a user's wrist. In such embodiments, the methods and systems for gesture recognition implemented on the electronic device (wristwatch) can be suited for recognizing gestures associated with the movements of the user's wrist, which are the same or essentially the same as the movements of the watch itself, and which can be sensed by a three-dimensional accelerometer sensor input provided by an accelerometer included in the watch (or similar inputs provided by other motion-sensing devices like a gyroscope). Among the gestures that can be sensed are, for example, a handshake gesture, a handwave gesture, and a fist bump gesture.

The present disclosure envisions a robust procedure for recognizing gestures. The procedure can involve gathering a collection of recorded trials, potentially including trials with multiple users, multiple trials per user, and/or multiple sensor inputs for each trial, and determining model constants including template length, where there will be one template (or "snippet") for each sensor input (averaged over all trials). Further, upon analyzing the trial information and creating a gesture template, then real-time gestures can be recognized. The manner in which gestures are recognized can take into account various issues. For example, some position metrics can be taken into account as indications of good position, and positional variations that are indicative of bad/inappropriate positions can be ignored assuming the durations of such bad/inappropriate positions are short. Also in at least some embodiments, gesture recognition takes into account which sensor inputs to use, which metrics to use, which metric/sensor input combinations to use, and what threshold settings to use. In at least some embodiments, linear regression can be performed to determine best predictors for recognition of a gesture based on the recorded trials and model constants. Also, models can be validated against new trials.

Referring to FIG. 1, an example electronic device 100 is a wristwatch-type product shown in a first image 101 to be positioned on and supported by a lower arm or wrist 102 of a user (shown in phantom) using a wristband 104. Given this arrangement, the electronic device 100 moves along with the lower arm 102 when the user moves the lower arm to perform gestures as described below. In this drawing, the electronic device 100 is worn on a dorsal side of a left wrist. The wristwatch, however, may be worn in a variety of ways including on the left or right arm, on the dorsal side or the palmar side. Note also that the band 104 may be tighter or looser depending on user preference.

In the present embodiment, the electronic device 100 particularly includes a display 106 that is both able to display visual images including a time and a message, for example, as would be displayed when used as a stopwatch or a wristwatch. The electronic device 100 also has a number of discrete keys or buttons 108 that serve as input components of the electronic device. However, in other embodiments these keys or buttons (or any particular number of such keys or buttons) can be implemented using a touch-screen display or other alternate technologies.

Although FIG. 1 particularly shows the electronic device 100 as including the display 106 and keys or buttons 108, these features are only intended to be examples of components/features on the electronic device, and in other embodiments the electronic device need not include one or more of these features and/or can include other features in addition to or instead of these features. Further, although FIG. 1 shows the electronic device 100 to be a wristwatch, the electronic device 100 is intended to be representative of a variety of electronic devices including other personal electronic devices and mobile devices such as, for example, personal digital assistants (PDAs), radios, smart phones, tablet computers, or other handheld or portable electronic devices. In alternate embodiments, the electronic device can be a headset, an armband, or another form of wearable electronic device, including a media player (e.g., MP3, MP4, DVD, ebook), a media recorder (e.g., digital or video camera), a gaming controller, or a remote controller. More examples include a navigation device, a laptop or notebook computer, a netbook, a pager, or another type of communication device. Indeed, embodiments of the present disclosure are intended to encompass or be applicable to any of a variety of electronic devices that are capable of or configured for recognizing spatial gestures.

In addition to the above-described components, the electronic device 100 further includes an accelerometer 110 (shown in phantom) that is configured to sense movements/accelerations of the electronic device. By virtue of the accelerometer 110, the electronic device is able to sense accelerations along x, y, and z axes as also shown in FIG. 1, which (as discussed below) particularly allows the electronic device to sense spatial gestures as described below. In the present embodiment, the y-axis is defined to be the vertical axis (up/down relative to the display), the x-axis is defined to be the horizontal axis (left/right relative to the display), and the z-axis is defined to be the depth axis (in/out relative to the display). However, it should be appreciated that the orientations of these axes are merely exemplary and based on common convention. Given the orientations of the axes as shown in FIG. 1 and the orientation of the electronic device 100 with respect to the force of gravity 120 with all acceleration due to gravity along the y-axis, a raw data point with 3D acceleration can be represented as (x, y, z), and a magnitude of acceleration is defined by:

$$\mathrm{mag}=(x,y,x)|=\sqrt{x^2-y^2+z^2} \qquad (1)$$

Thus, when the electronic device 100 and lower arm 102 are positioned as shown in FIG. 1 in a rest (non-moving) state, the detected values of the accelerometer along the x, y, and z axes (x, y, z) are (0, 1G, 0), where G is acceleration due to gravity, and the overall magnitude of acceleration of the stationary device will be 1G.

Further referring to FIG. 1, it will be appreciated that movement of the lower arm 102 can cause variation in the orientation positions of the electronic device 100. FIG. 1 includes respective first, second, and third additional images 170, 180, and 190 of the electronic device 100 in respective first, second, and third orientation positions differing from the position of the electronic device as shown on the lower arm 102 in the first image 101. More particularly, in contrast to the orientation value of the electronic device 100 when positioned on the lower arm 102 as shown in the first image 101, which is an orientation of 0 degrees (with the device being stationary and positioned such that the x-axis is horizontal and the y-axis is vertical with the positive portion of the y-axis pointing vertically upward), the first additional image 170 shows the electronic device 100 having an orientation of +90 degrees (with (x,y,z)=(1G, 0, 0)), the second additional image 180 shows the electronic device 100 having an orientation of +/−180 degrees (with (x,y,z)= (0, −1G, 0)), and the third additional image 190 shows the electronic device having an orientation of −90 degrees (with (x,y,z)=(−1G, 0, 0)), where orientation can be calculated as follows:

$$\text{orientation} = a\tan 2(x,y) \quad (2)$$

Further, although not illustrated in FIG. 1, a further characteristic of tilt pertaining to the electronic device 100 is defined by:

$$\text{tilt} = a\sin\left(\frac{z}{\text{mag}}\right) \quad (3)$$

Although FIG. 1 shows the electronic device 100 in various positions that all correspond to a tilt value of zero, it will be appreciated that the electronic device can attain different levels of tilt given appropriate further movement of the lower arm 102 to which the electronic device is strapped. Geometrically, the electronic device 100 shown in FIG. 1 has six faces, with four of those faces being the four edges (top, bottom, left and right) and the remaining faces being the front and back surfaces, where the display 106 particularly forms (or is formed as part of) the front surface and the back surface is directly interfacing the lower arm. Given this to be the case, it will be appreciated that when the electronic device 100 is positioned on any of its edges (that is, when the electronic device is positioned in any of the manners shown in FIG. 1), the tilt value for the electronic device will be zero degrees. Alternatively, if the electronic device 100 is moved so that the front face of the electronic device 100 points up, then the electronic device will have a tilt value of +90 degrees (and the acceleration values of the device will be (0,0,1G)), and if the electronic device is moved so that the front face points down, then the electronic device will have a tilt value of −90 degrees (and (0,0, −1G) as acceleration values).

As discussed further below, the acceleration input (x,y,z) provided by the accelerometer 110, along with tilt and orientation values, can be used to assess whether the electronic device 100 is in a valid starting position for a particular gesture to occur. Additionally in regard to the definitions of orientation and tilt, it should be appreciated that, even when the device is in motion, these tilts and orientation terms apply. That is, given the positioning of the electronic device 100 on the lower arm 102 as shown in the first image 101 (but not the positioning of the electronic device in any of the first, second, or third additional images 170, 180, and 190), if the wrist in FIG. 1 was moving (as long as it was not rotating around the z-axis), visually one would see and define tilt and orientation to be 0 degrees. That said, in general, the equations for tilt and orientation depend on the device being at rest to allow accurate measurement of tilt and orientation through the use of gravity.

Figure 2:
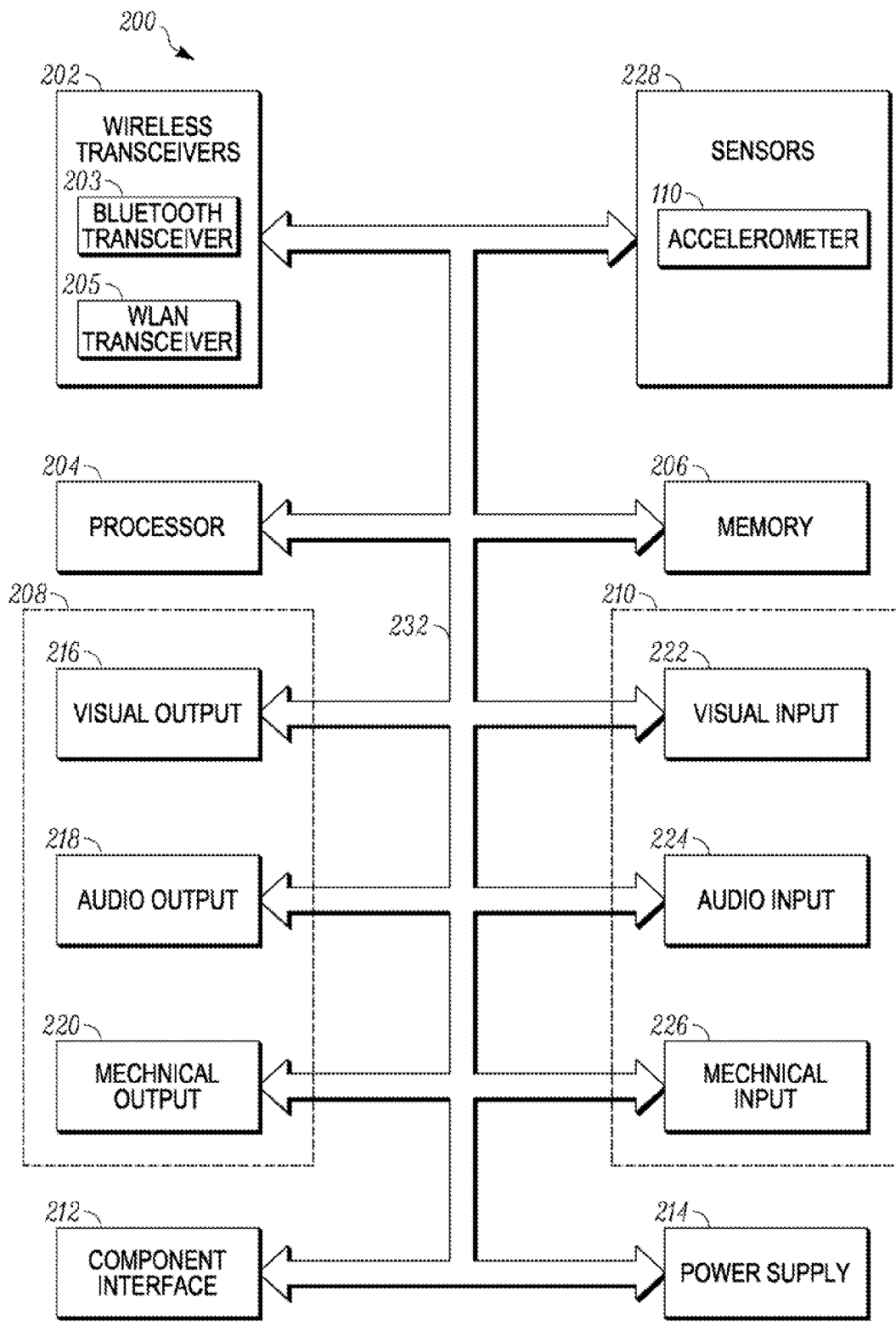
FIG. 2 is a block diagram showing example components of the electronic device of FIG. 1.

FIG. 2 provides a block diagram illustrating example internal components 200 of the electronic device 100 of FIG. 1, which in the present embodiment is a wristwatch having wireless communications capability. As shown in FIG. 2, the internal components 200 of the electronic device 100 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a wireless personal area network (WPAN) transceiver 203 and a wireless local area network (WLAN) transceiver 205. More particularly, the WPAN transceiver 203 is configured to conduct short-range wireless communications, using a protocol such as IEEE 802.15 Bluetooth®, IEEE 802.15.4 ZigBee, NFC, RFID, infrared, HomeRF, Home Node B, or others or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for cellular or non-cellular wireless communications.

Although in the present embodiment the electronic device 100 has two of the wireless transceivers 202 (that is, the transceivers 203 and 205), the present disclosure is intended to encompass numerous embodiments in which any arbitrary number of wireless transceivers employing any arbitrary number of communication technologies are present as well as electronic devices that do not have any wireless communications capability. In the present embodiment, by virtue of the use of the wireless transceivers 202, the electronic device 100 is capable of communicating with any of a variety of other devices or systems (not shown) including, for example, other electronic devices including mobile devices, cell towers, access points, other remote devices, etc. Depending upon the embodiment or circumstance, wireless communication between the electronic device 100 and any arbitrary number of other devices or systems can be achieved.

Operation of the wireless transceivers 202 in conjunction with others of the internal components 200 of the electronic device 100 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio, and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen such as the display screen 106. Likewise, by example, the input device(s) 210 can include one or more visual input devices 222 such as an optical sensor (for example, a camera lens and photosensor), one or more audio input devices 224 such as the microphone 108 of FIG. 1, and/or one or more mechanical input devices 226 such as a flip sensor, keyboard, keypad, selection button, navigation cluster, touch pad, capacitive sensor, motion sensor, and/or switch. In the electronic device 100 of FIG. 1, the keys or buttons 108 are among the mechanical input devices 226. Operations that can actuate one or more of the input devices 210 can include not only the physical pressing/actuation of buttons or other actuators, but can also include, for example, opening or unlocking some portion of the electronic device, moving the device to actuate a motion, moving the device to actuate a location positioning system, and operating the device.

As mentioned above, the internal components 200 also can include one or more of various types of sensors 228. In the present embodiment, the sensors 228 particularly include the accelerometer 110 shown in FIG. 1, which is used for gesture detection as described herein. Although in the present embodiment employs the accelerometer 110 for position sensing and motion and gesture detection, in other embodiments other sensor(s) can be used instead of, or in combination with, the accelerometer to perform such sensing and detection. For example, in some alternate embodiments, a gyroscope and/or a barometer can be used instead of, or in addition to, the accelerometer 110. In some embodiments, more than one of these sensors and/or other sensors are present and used for position sensing and motion and gesture detection.

Further, in addition to such sensor(s), depending upon the embodiment, the sensors 228 can include any of a variety of other sensor types including, for example, proximity sensors (e.g., a light detecting sensor, an ultrasound transceiver, or an infrared transceiver), touch sensors, altitude sensors, and one or more location circuits/components that can include, for example, a Global Positioning System (GPS) receiver, a triangulation receiver, a tilt sensor, or any other information collecting device that can identify a current location or user-device interface (carry mode) of the electronic device 100. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). For example, in embodiments in which a touch screen display is employed, such a touch screen display can be considered to constitute both a visual output device and a mechanical input device (by contrast, the keys or buttons 108 are mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the electronic device 100 can be supplemented or replaced by other memory portion(s) located elsewhere apart from the electronic device and, in such embodiments, the electronic device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), and informational data. Each operating system includes executable code that controls basic functions of the electronic device 100, such as interaction among the various internal components 200, communication with external devices via the wireless transceivers 202 and/or the component interface 212, and storage and retrieval of programs and data to and from the memory portion 206. As for programs, each program includes executable code that utilizes an operating system to provide more specific functionality, such as file system service and handling of protected and unprotected data stored in the memory portion 206. Such programs can include, among other things, programming for enabling the electronic device 100 to perform processes such as calculating position, movements, acceleration, or metrics (such as the correlation and p2p metrics discussed herein) based upon information from sensors such as the accelerometer 110, sampling and processing gesture-related information, and performing processes for gesture recognition such as the processes described herein. Finally, with respect to informational data, this is non-executable code or information that can be referenced and/or manipulated by an operating system or program for performing functions of the electronic device 100.

Depending upon the embodiment, an electronic device such as the electronic device 100 can be configured to recognize a variety of gestures and gesture types. Turning to FIGS. 3, 4, and 5, three example types of gestures that can be detected by the electronic device 100 in the present embodiment are illustrated schematically. FIG. 3 particularly provides first and second illustrations 300 and 302, respectively, of a user performing a "fist bump" gesture. As is evident by comparing the second illustration 302 with the first illustration 300, the fist bump gesture is one in which the user extends the lower arm 102 from a retracted position as shown in the first illustration 300 outward to a partly-extended position as shown in the second illustration 302, with the extending of the lower arm (particularly the wrist on which the electronic device 100 is supported) occurring generally in the direction represented by an arrow 304 (that is, along the x-axis shown in FIG. 1). Thus, the user's primary movement detected by the electronic device 100 during a fist bump gesture is acceleration along the x axis due to the arm extension.

Also, as the lower arm 102 is extended, the user's fist and wrist (at which the electronic device 100 is particularly supported) rotate approximately 90 degrees about an arm rotation axis parallel to the indicated direction of the arrow 304 (an axis parallel to the (x) axis of FIG. 1), the arm rotation axis generally extending within and along the length of the lower arm. Thus, the gravity component of acceleration detected by the accelerometer 110 of the electronic device 100 shifts from acting along the −y axis to acting along the +z axis due to the wrist rotation. Further, although the electronic device 100 will start with a tilt=0 and an orientation=+/−180 (with the definitions of tilt and orientation being as discussed above), the electronic device will ultimately have a tilt of 90 degrees due to the change of axis for gravity. Correspondingly, detected acceleration goes from (0, −1G, 0) to (0, 0, 1G). That is, at the start of the fist bump gesture, the position of the electronic device 100 can be substantially that shown in the second additional image 180 of FIG. 1, where the electronic device has a tilt value of 0 degrees and an orientation of +/−180 degrees with the bottom edge of the device facing upward. By contrast, at the end of the gesture, the position of the electronic device 100 will be one in which the front surface corresponding to the display screen 106 is facing up, where the tilt value has become 90 degrees. Additionally, to achieve the "bump" effect, the fist bump gesture ends when the user abruptly ceases extending the lower arm 102 outward, when the lower arm has reached the extended position shown in the second illustration 302. The fist bump gesture therefore entails a large change in acceleration due to stopping (even larger for actual bump with something).

As mentioned previously, the lower arm 102 can be either the left arm or the right arm of the user. Thus, there will be positive +x axis acceleration when the lower arm 102 on which the electronic device 100 is worn is the left arm (the left wrist), and there will be negative −x axis acceleration when the lower arm is the right arm (right wrist). Although following the "bump", typically the lower arm 102 is then retracted by the user, this aspect of movement is not a significant aspect of the fist bump gesture; that is, the end point of the fist pump gesture can be considered to occur substantially immediately after the bump has occurred.

By comparison, FIG. 4 provides first, second, and third illustrations 400, 402, and 404, respectively, of a user performing a "handshake" gesture. As shown, the handshake gesture first involves the user extending the lower arm 102 outward as shown in the first illustration 400 by an arrow 406, then rotating the lower arm 102 downward about an elbow 403 as shown in the second illustration 402 by an arrow 408, and finally rotating the lower arm upward also about the elbow as shown in the third illustration 404 by an arrow 410. It should be appreciated that the upward and downward movements can occur in the reverse order, and still be recognized as a handshake. It is assumed that an electronic device 100 worn on the right wrist will recognize a handshake movement in keeping with convention. Of course, an electronic device 100 worn on the left wrist will also recognize a handshake movement (in fact, the device actually experiences the same acceleration regardless of the wrist).

Further, FIG. 5 provides first, second, and third illustrations 500, 502, and 504, respectively, of a "handwave" gesture. As shown, the handwave gesture first entails the user extending the user's entire arm including the lower arm 102 outward, with the lower arm extending generally vertically upward (e.g., against the force of gravity) from the elbow 403 of the arm. After the lower arm 102 is in this position as shown in the first illustration 500, the handwave gesture then involves rotating the lower arm 102 sideways about the elbow 403, as represented by an arrow 506, outward away from the head of the user. As a result of this rotation, the lower arm 102 takes on the position shown in the second illustration 502. Upon reaching this position, the user switches the direction of rotation of the lower arm 102, to be in the opposite direction as represented by an arrow 508. Ultimately the lower arm 102 returns to a vertically-extending position as shown in the third illustration 504. It should be appreciated that the side-to-side movement of the lower arm 102 can occur in directions opposite to those shown, such that the lower arm initially proceeds inward toward (rather than away from) the head of the user, and then returns outward. Also, there can be a wider range of movement (that encompasses both movement toward the head from the vertical position shown in the first illustration 500 and movement away from the head from the vertical position shown in the first illustration), or a repeated waving motion rather than simply a single waving motion. As mentioned previously, either wrist (or hand) may support the electronic device 100.

It will be appreciated that each of the different types of gestures described above in relation to FIGS. 3, 4, and 5 have characteristic movement patterns that remain the same or substantially (or largely) the same each time a specific instance of each given type of gesture is performed. Nevertheless, the exact movement associated with a given type of gesture can and typically does vary with each instance in which the given type of gesture is performed. That being the case, in the present embodiment such sensed movement (and signals indicative thereof) is analyzed/processed by the electronic device 100 in a manner involving a comparison with at least one gesture template that enables detection of gestures as instances of a gesture type notwithstanding variations in the movements associated with each given gesture instance and the differences in data sensed based on whether a left or right arm is supporting the electronic device 100. That is, the analysis/processing allows for gesture recognition to be performed in a manner that tolerates some variations in the movements of different gestures that are all of the same gesture type and that should be recognized as such.

More particularly, the analysis/processing performed by the electronic device 100 (and particularly the processor 204 thereof) in the present embodiment entails several aspects represented by a state diagram 1400 shown in FIG. 14 and a flow chart 1500 shown in FIG. 15, which are discussed in detail below. In general, this analysis/processing involves several steps. First, prior to performing analysis/processing of movement data received with respect to any given gesture instance that is to be detected, a gesture template or snippet is determined and provided to the electronic device 100 (or developed through operation of the electronic device). The gesture template serves as a representation of "typical" movement associated with the type of gesture that is to be detected. In the present embodiment, such a gesture template is developed based upon sample movement data associated with a given type of gesture. That is, gesture templates/snippets are created experimentally, prior to actual gesture recognition. In some circumstances, the gesture templates/snippets can be developed by the user of the electronic device 100 but, in other circumstances, the gesture templates/snippets can be software loaded onto the electronic device at the time of manufacture or downloaded at some time during the lifetime of the electronic device. Additionally, multiple gesture templates may be developed for a single gesture type; for example, a fist bump gesture may have four gesture templates.

Figure 6:
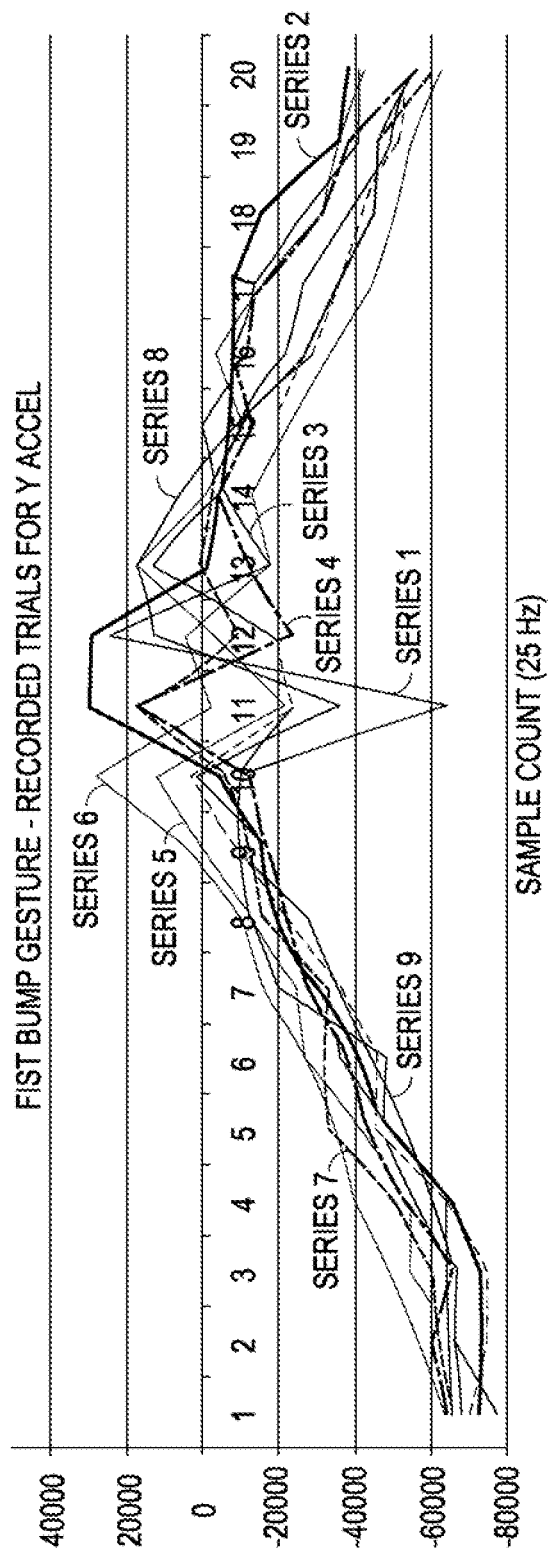
FIG. 6 is a graph of example sample y-acceleration data associated with example fist bump gestures such as that illustrated by FIG. 3.
Figure 7:
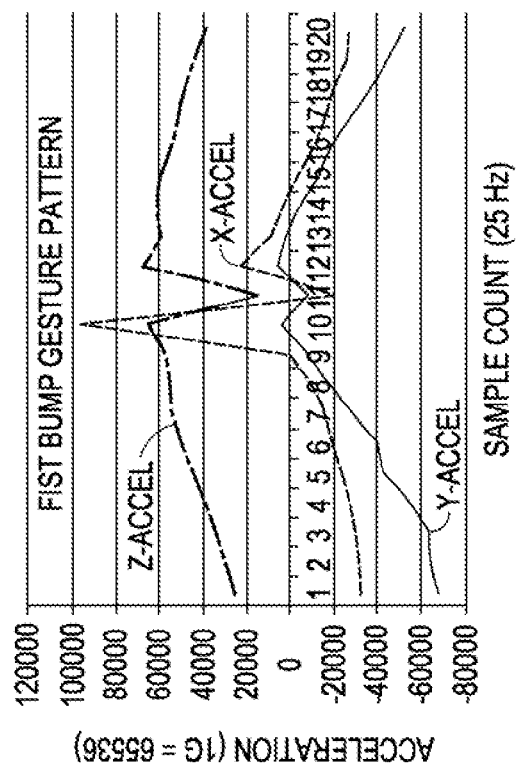

For example, in regard to a fist bump gesture type as discussed with respect to FIG. 3, FIG. 6 shows example sample movement data (particularly acceleration data) as provided by the accelerometer 110 recorded over a period of time during which a user wearing an electronic device 100 on the dorsal side of a left wrist made fist bump motions, with samples taken at a rate of 25 Hz. More particularly, FIG. 6 shows nine series of sample movement data (shown as nine different curves labeled respectively Series 1, Series 2, Series 3, Series 4, Series 5, Series 6, Series 7, Series 8, and Series 9) corresponding to nine different sample gesture movements that were obtained via the accelerometer 110. Referring further to FIG. 7, based at least in part upon the sample movement data of FIG. 6, a fist bump gesture pattern is developed, which in the present embodiment is shown as including three different components (shown as three different curves), namely, an x-acceleration component, a y-acceleration component, and a z-acceleration component, which are indicative of "typical" accelerations that would be experienced by the accelerometer 110 along the x, y, and z axes shown in FIG. 1 during a typical instance of a fist bump gesture. Note how the sample movement data of FIG. 6 is generalized as the y-acceleration component (curve) of FIG. 7.

Figure 8:
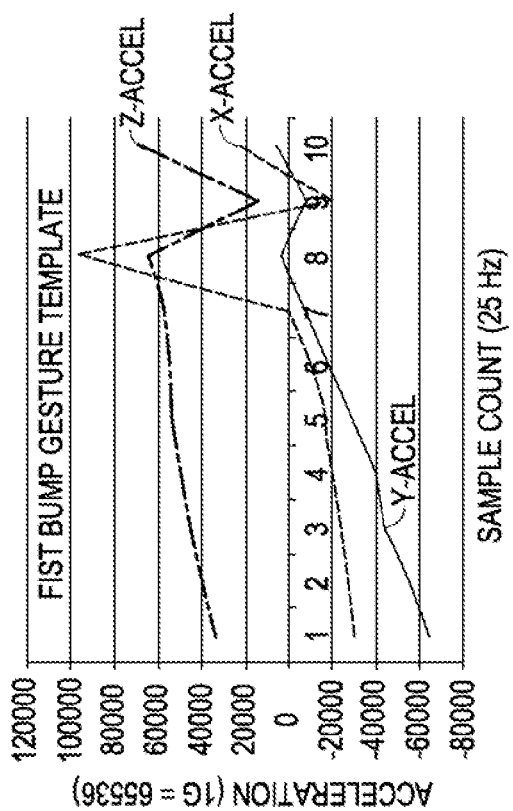
FIGS. 7 and 8 are graphs showing example fist bump gesture patterns that can be generated at least partly based upon the data of FIG. 6, where the graph of FIG. 8 can be considered to show an example fist bump gesture template, and the graph of FIG. 8 is the same as that of FIG. 7 except insofar as latter portions of the patterns of FIG. 7 are not present in the graph of FIG. 8.

Additionally, referring further to FIG. 8, an example fist bump gesture template or snippet is developed based upon the fist bump gesture pattern of FIG. 7. The gesture template of FIG. 8 again has x-acceleration, y-acceleration, and z-acceleration components, and these component curves are identical to those of FIG. 7, except insofar as latter portions of the component curves of FIG. 7 have been removed because the fist bump gesture is understood to be complete upon the "bump" occurring (when the lower arm 102 ceases being extended, as shown in the second illustration 302 of FIG. 3), and any sensed movement occurring after that time is not relevant to determination of fist bump gestures.

Figure 9:
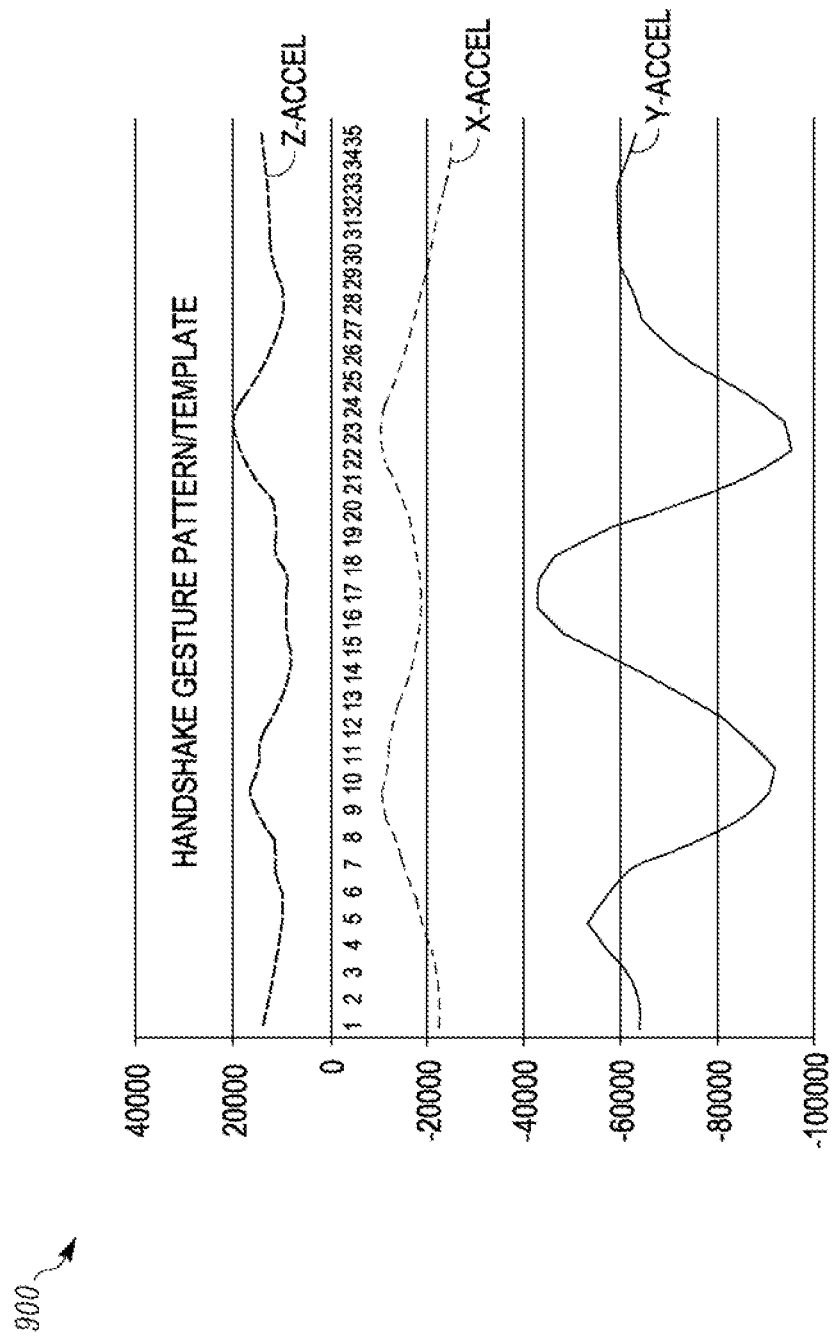
FIGS. 9 and 10 respectively show graphs of example handshake gesture and handwave gesture templates, respectively, which can be generated based upon sample data.
Figure 10:
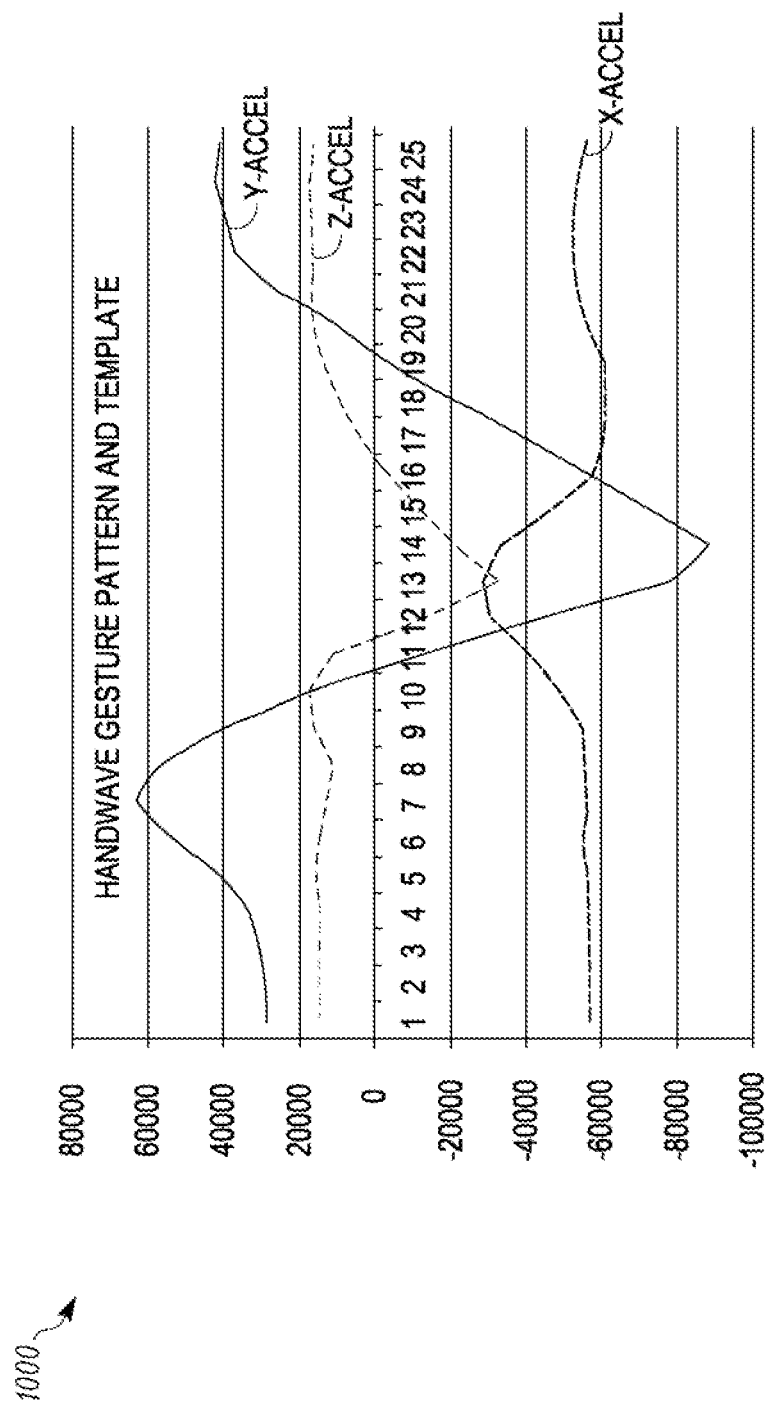

Although FIGS. 6, 7, and 8 relate particularly to determining one gesture template (snippet) for a fist bump type of gesture, such gesture templates (snippets) are equally determinable in relation to different fist bump configurations as well as other gesture types such as the handshake gesture type of FIG. 4 and the handwave gesture type of FIG. 5, based upon sample movement data obtained in relation to those gesture types. Thus, referring additionally to FIGS. 9 and 10, FIG. 9 shows a graph 900 of an example handshake gesture template having x-acceleration, y-acceleration, and z-acceleration component curves, and FIG. 10 shows a graph 1000 of an example handwave gesture template having x-acceleration, y-acceleration, and z-acceleration component curves. Note that each gesture type (e.g., fist bump, handshake, handwave) may have multiple templates based on whether the watch is worn on the right or left wrist, whether the watch faces the dorsal or palmar side, and other variables. If the electronic device determines where it is being worn, processing for irrelevant templates need not occur.

Mathematically, in the present embodiment, a gesture template (or snippet) S made up of L samples is expressed by the sequence:

$$S = \{s_1, s_2, \ldots s_L\} \quad (4)$$

Further, the snippet's mean and variance respectively are given by equations (5) and (6), respectively:

$$\mu_s = \frac{1}{L} \sum_{i=1}^{L} s_i \quad (5)$$

$$\sigma_s^2 = \frac{1}{L} \sum_{i=1}^{L} (s_i - \mu_s)^2 \quad (6)$$

The mean adjustment of the snippet is important for pattern matching. For example, it prevents an all-positive snippet from having a high correlation with an all-positive window with a different pattern. It should be understood that the standard deviation of the snippet, $\sigma_s$, is equal to the square root of the variance of the snippet, $\sigma_s^2$, as calculated in accordance with equation (6) above.

Assuming that a gesture template (or snippet) has been developed by the electronic device 100 or is otherwise made available to the electronic device, then additional analysis/processing can be performed by the electronic device for the purpose of recognizing specific gesture instances that occur and are sensed by the electronic device by way of the accelerometer 110 (and/or other sensing device(s)). In general, the analysis/processing performed in order to detect and recognize a given gesture instance entails comparing data sensed by the accelerometer 110 (and/or other sensing device(s)) during a given time period, with the gesture templates (or snippets) obtained in regard to that type of gesture. That said, the particular analysis/processing can vary depending upon the embodiment, and FIG. 14 and FIG. 15 are representative of example processing states and steps/operations that occur in one example embodiment.

More particularly, in the present embodiment, the analysis/processing performed by the electronic device 100 (and processor 204 thereof) for gesture recognition involves particular mathematical relationships. First, as already discussed above, to perform gesture recognition the electronic device 100 detects movement and collects movement data. To facilitate comparison of such detected movement data with a gesture template (snippet), it is presumed that the real-time collected samples of movement data fill a window W with the same length as the snippet (that is, with L samples), represented by equation (7):

$$W = \{w_1, w_2, \ldots, w_L\} \quad (7)$$

Given such a window of detected movement data, it is then possible to calculate the window's modified variance and modified covariance with the snippet. In the present embodiment, the modified variance value and modified covariance value are respectively determined depending on the snippet's mean (not the window's mean) and are given respectively by equations (8) and (9), respectively, below:

$$\hat{\sigma}_w^2 = \frac{1}{L} \sum_{i=1}^{L} (w_i - \mu_s)^2 \quad (8)$$

$$\hat{\sigma}_{s,w} = \frac{1}{L} \sum_{i=1}^{L} (s_i - \mu_s)(w_i - \mu_s) \quad (9)$$

It should be understood that the modified standard deviation of the window, $\hat{\sigma}_w$, can be defined as being equal to the square root of the modified variance of the window, $\hat{\sigma}_w^2$, as calculated in accordance with equation (8) above.

Additionally, after the modified variance, modified covariance, and modified standard deviation values of the window have been determined in addition to the standard deviation of the snippet, a correlation metric ($M_{corr}$) can be determined, with the correlation metric being an indication of how well the detected gesture movement data matches the gesture template (snippet) and thus an indication of the likelihood that a gesture of the type corresponding to the gesture template (snippet) has occurred. In the present embodiment, the correlation metric ($M_{corr}$ or $\hat{\rho}_{s,w}$) is a modified Pearson correlation coefficient and is given by:

$$M_{corr} = \hat{\rho}_{s,w} = \frac{\hat{\sigma}_{s,w}}{\sigma_s \hat{\sigma}_w} \qquad (10)$$

As with the standard (common) Pearson correlation coefficient (discussed further below), the denominator of the modified Pearson correlation metric $M_{corr}$ normalizes the metric to be between −1.0 and 1.0, which can be scaled to produce a score or estimated likelihood as to whether the detected gesture data (by comparison with the snippet) is indicative of the occurrence of a gesture of the given type corresponding to the snippet.

Although the correlation metric $M_{corr}$ is a useful measure of whether detected movement is in fact a gesture of a given type corresponding to the gesture template (snippet), other metric(s) can also be determined and utilized in the gesture recognition process. More particularly, in the present embodiment, the analysis/processing performed by the electronic device 100 (and processor 204 thereof) further involves determining and utilizing a peak-to-peak metric ($M_{p2p}$). The same window with the same samples used for the correlation metric ($M_{corr}$), namely, that represented by equation (7) above, is used for the peak-to-peak metric ($M_{p2p}$). Using the samples of this window, a maximum sample of the window $W_{max}$ and a minimum sample of the window $W_{min}$ can be defined as follows:

$$W_{max} = \max\{w_1, w_2, \ldots w_L\} \qquad (11)$$

$$W_{min} = \min\{w_1, w_2, \ldots w_L\} \qquad (12)$$

Further, based upon these quantities, the peak-to-peak metric ($M_{p2p}$) is further defined as:

$$M_{p2p} = W_{p2p} = W_{max} - W_{min} \qquad (13)$$

Given the above, in the present embodiment the full set of values and metrics available for gesture recognition for the limited case of using just the single input provided by the accelerometer 110 (which as a three-dimensional/3D accelerometer can thus actually be considered as providing three different inputs corresponding to the x-axis, y-axis, and z-axis of FIG. 1) include the samples x,y,z, position information based upon those samples, calculated tilt and orientation, correlation metrics, and peak-to-peak metrics. That is, the 3D accelerometer sensor inputs (raw input values x,y,z) at the electronic device 100 are considered with respect to each of alignment of the electronic device with the Cartesian coordinate system (x, y, and z axes), tilt, and orientation as defined above, and also are used as the actual motion associated with the gesture based upon which the correlation and peak-to-peak metrics are calculated.

Further in the present embodiment, these various values/metrics are used for different evaluative purposes. More particularly, the samples x,y,z particularly can be used to assess position validity for the start of a gesture, and the calculated tilt and orientation also can be used to assess position validity for the beginning of a gesture. For example, if it is determined based upon the tilt and orientation calculations pertaining to the electronic device 100 that the lower arm 102 is extended directly vertically rather than substantially horizontally with respect to gravity, then it can be immediately determined that any detected movement could not pertain to a fist bump gesture (because by definition the fist bump gesture presumes starting with a horizontally-extending lower arm). By comparison, the correlation metrics for x,y,z and also the peak-to-peak metrics for x,y,z can be used for gesture detection, insofar as those metrics allow for a comparison between movement data and the gesture template(s) for one or more types of gestures.

Notwithstanding the above, in alternate embodiments other metrics (and other values or data) can be used for gesture recognition and/or to determine whether a given data set is potentially that of a defined gesture. Indeed, the present disclosure envisions that numerous other formulas and mathematical relations can be used in various embodiments or circumstances to determine or provide various metrics of interest relating to position, tilt, orientation, correlation, and peak-to-peak values for particular gesture types as well as other types of metrics, instead of or in addition to those discussed above. For example, in some other embodiments, additional local frame metrics (samples, p2p, and correlation) can be introduced based on other sensor inputs (e.g., Euler angles and angular velocities) for gesture recognition.

Further for example, although equation (10) above provides an example mathematical definition of a correlation metric ($M_{corr}$), this particular correlation metric can be replaced by others. The correlation metric of equation (10) was intentionally designed to use just the snippet's mean (that is, the correlation metric of equation (10) is based upon window's modified variance and modified covariance, each of which only depends on the snippet's mean and not on the window's mean), due to the resulting properties of this metric and, as such, the correlation metric established by equation (10) can be considered to be a modified Pearson correlation coefficient. Nevertheless, a typical correlation statistic between two sequences (e.g., between a window sequence of samples and a snippet) would depend on both sequences' means. In this regard, in alternate embodiments, a standard Pearson metric based on the Pearson correlation coefficient can be introduced and utilized, for example, in combination with the correlation metric of equation (10).

In the present context relating to snippets and windows of data samples, such a standard Pearson correlation coefficient can be defined as follows. First, given a snippet S as defined by equation (4) above, the snippet's mean and variance are respectively given by equations (5) and (6), already discussed above. Further, the mean and variance of a window W defined according to equation (7) above are respectively given by equations (14) and (15), respectively, below:

$$\mu_w = \frac{1}{L}\sum_{i=1}^{L} w_i \qquad (14)$$

$$\sigma_w^2 = \frac{1}{L}\sum_{i=1}^{L} (w_i - \mu_w)^2 \qquad (15)$$

It should be understood that the standard deviation of the window, $\sigma_w$, can be defined as being equal to the square root of the variance of the window, $\sigma_w^2$, as calculated in accordance with equation (15) above.

Given the above, the covariance between the snippet and window depends on both the snippet's mean and the window's mean and is defined by equation (16) as follows:

$$\sigma_{s,w} = \frac{1}{L}\sum_{i=1}^{L}(s_i - \mu_s)(w_i - \mu_w) \quad (16)$$

Finally, in view of the above, a standard Pearson metric constituting the Pearson correlation coefficient ($M_{pearson}$ or $\rho_{s,w}$) is given by equation (17):

$$M_{Pearson} = \rho_{s,w} = \frac{\sigma_{s,w}}{\sigma_s \sigma_w} \quad (17)$$

Figure 12:
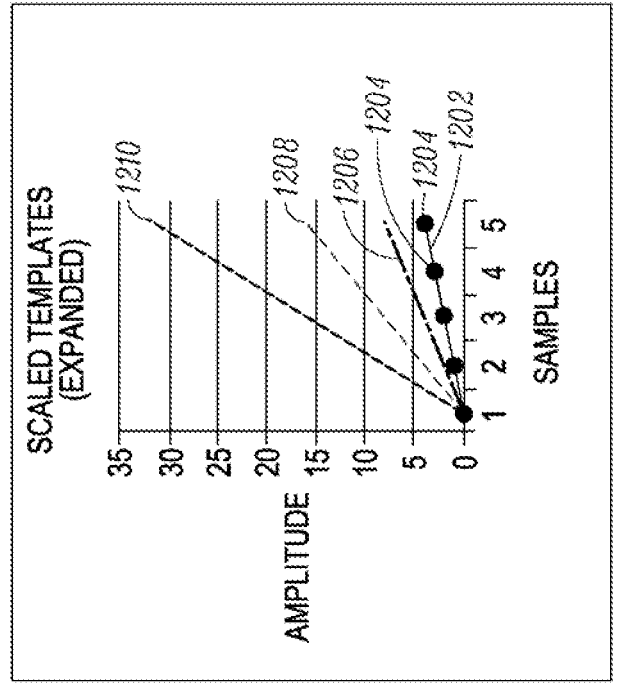
FIGS. 11-13 respectively show example offset templates, scaled templates (expanded), and scaled templates having the same mean, respectively.
Figure 11:
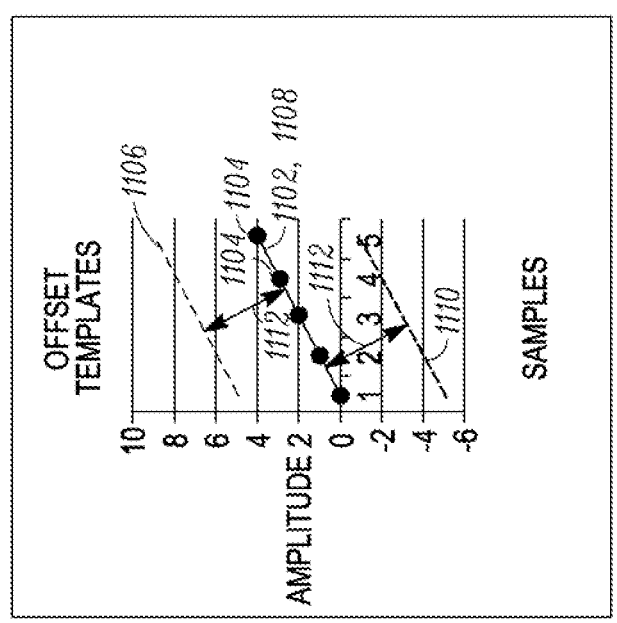
Figure 13:
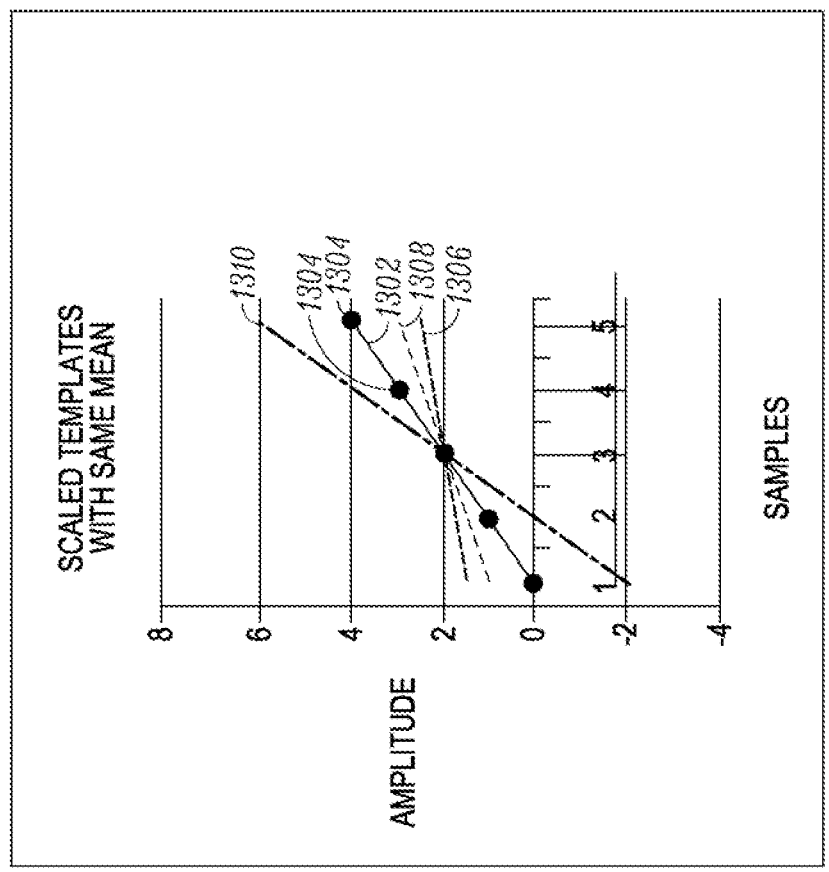

Although various metrics can be used depending upon the embodiment, it should be noted that the correlation metric established by equation (10), which again can be considered a modified Pearson correlation coefficient, differs from the "standard" Pearson correlation metric established by equation (17). FIGS. 11, 12, and 13 are illustrative of certain example gesture templates S and gesture data windows W in relation to which correlation metrics can be calculated, and more particularly for which certain differences in the calculated correlation metrics resulting from use of the modified Pearson correlation coefficient and the standard Pearson correlation coefficient are pronounced. FIGS. 11, 12, and 13 thus illustrate certain advantages of using the modified Pearson correlation coefficient of equation (10) instead of the standard Pearson correlation metric of equation (17) as discussed further below.

More particularly, FIG. 11 shows an example of a gesture template that is a linear curve 1102 established by five samples 1104, and additionally shows as examples first, second, and third gesture data curves 1106, 1108, and 1110, respectively, which are established by three different sets of example gesture data (three different windows W). It will be noted that the second gesture data curve 1108 happens to overlap exactly the linear curve 1102. In regards to these curves, the standard Pearson correlation metric $M_{Pearson}$ would take on a value of 1.0 in relation to each of the first, second, and third gesture data curves 1106, 1108, and 1110 (with each being compared to the gesture template represented by the linear curve 1102), because the slope of each of these gesture data curves is identical to that of the linear curve 1102. In contrast, the modified Pearson correlation metric $M_{corr}$ would only take on a value of 1.0 with respect to the second gesture data curve 1108, and would take on a value of 0.3 with respect to each of the first and third gesture data curves 1106 and 1110, due to an offset 1112 existing between the linear curve 1102 and each of those first and third gesture data curves.

Given this to be the case, it can be appreciated that use of the modified Pearson correlation metric is advantageous vis-à-vis use of the standard Pearson correlation metric, insofar as the modified Pearson correlation metric allows for an offset to be taken into account in determining whether the gesture data sufficiently corresponds to the gesture template so as to indicate that a gesture has occurred (by contrast, the standard Pearson correlation metric does not indicate such offsets). It should be noted further in regards to the data/curves illustrated in FIG. 11 that the peak-to-peak metrics for each of the gesture data curves 1106, 1108, and 1110 are identical and thus, in this example, the peak-to-peak metrics cannot provide help in discerning between the different gesture data curves.

Also it should be noted that, even if FIG. 11 was modified so that each of the gesture data curves 1106, 1108, and 1110 had slopes that were the opposite of what are shown (that is, negative slopes, with each of the curves decreasing in value as the linear curve 1102 increases in value), the correlation metrics for those gesture data curves would be the same as discussed above, except insofar as each of those correlation metrics would have a negative value. That is, the modified Pearson correlation metric for the gesture data curve 1108 would be −1.0 if it had the opposite slope to that shown in FIG. 11 (such that the curve passed through the middle one of the sample data points 1104 as it declined), and the data curves 1106 and 1110 would each have a modified Pearson correlation metric of −0.3. By contrast, the standard Pearson correlation metric for all three of the curves 1106, 1108, and 1110 modified as discussed above would be −1.0. Thus, the modified Pearson correlation metric would convey the departure of the various gesture data curves, in terms of the magnitude of their slopes (with decreasing magnitude), but the standard Pearson correlation metric would not convey this information.

Further, FIG. 12 shows another example gesture template that is a linear curve 1202 formed by five samples 1204 (the linear curve 1202 and samples 1204 can be, but need not be, the same as the linear curve 1102 and samples 1104 of FIG. 11). Further, FIG. 12 shows as examples first, second, and third gesture data curves 1206, 1208, and 1210, respectively, which are established by three different sets of example gesture data (three different windows W). In this case, as shown, each of the gesture data curves 1206, 1208, and 1210 has an initial data point that is identical to the first of the samples 1204, such that each of the gesture data curves begins at the same location as the linear curve 1202. However, each of the gesture data curves 1206, 1208, and 1210 progressively has a larger slope than that of the linear curve 1202 and its predecessors, with the third gesture data curve 1210 having the greatest slope of the three gesture data curves, and the first gesture data curve 1206 having the least slope of the three gesture data curves (but a slope still greater than that of the linear curve 1202).

Given the particular data/curves illustrated by FIG. 12, although peak-to-peak metrics will vary depending upon which of the gesture data curves 1206, 1208, and 1210 is compared to the linear curve 1202, the standard Pearson correlation metric will be the same value of 1.0 when calculated in relation to each of these three data curves. By contrast, the modified Pearson correlation metric will provide different values, namely, a value of 0.8 with respect to the first gesture data curve 1206, a value of 0.7 with respect to the second gesture data curve 1208, and a value of 0.6 with respect to the third gesture data curve 1210. Given this to be the case, it can be appreciated that use of the modified Pearson correlation metric is advantageous relative to use of the standard Pearson correlation metric, insofar as (generally speaking) as the pattern associated with a gesture data curve expands away from the gesture template (e.g., away from the linear curve 1204), the modified Pearson correlation metric conveys this departure by decreasing but, in contrast, the standard Pearson correlation metric is constant and fails to indicate these differences.

Additionally in regard to FIG. 12, it should further be appreciated that, alternatively, the curve 1210 can instead be considered a gesture template curve and each of the curves

1204, 1206, and 1208 can be considered the gesture data curves corresponding to different windows W of data. Given this interpretation, peak-to-peak metrics again will vary for the different gesture data curves (and can help discern between those patterns). However, the standard Pearson correlation metric again is 1.0 with respect to each of the curves 1204, 1206, and 1208, but the modified Pearson correlation metrics for the curves 1208, 1206, and 1204 respectively are 0.6, 0.2, and 0.1, respectively. Again, with FIG. 12 interpreted in this manner, this demonstrates that the modified Pearson correlation metric conveys the departure (or compression) of the gesture curves 1208, 1206, and 1204 as those curves progressively take on positions farther below the curve 1210 constituting the gesture template in this example, but the standard Pearson correlation metric fails to convey this information.

Further, FIG. 13 shows again an example gesture template that is a linear curve 1302 formed by five samples 1304 (the linear curve 1302 and samples 1304 can be, but need not be, the same as the linear curves 1102, 1202 and samples 1104, 1204 of FIGS. 11 and 12). Further, FIG. 13 shows as examples first, second, and third gesture data curves 1306, 1308, and 1310, respectively, which are established by three different sets of example gesture data (three different windows W). In this case, as shown, each of the gesture data curves 1306, 1308, and 1310 passes through a middle one of the samples 1304, but has a slope that is greater than or less than that of the linear curve 1302, such that each of the gesture data curves either begins below the linear curve 1302 and ends up above the linear curve (curve 1310) or vice-versa (curves 1306 and 1308). The third gesture data curve 1310 has the greatest slope of the three gesture data curves, the first gesture data curve 1306 has the least slope of the three gesture data curves, and the slopes of the linear curve 1302 and the curve 1308 are in between, with the slope of the curve 1302 larger than that of the curve 1308. Generally speaking, the gesture data curves 1306, 1308, and 1310 are patterns that are scaled templates that are all offset to have the same mean.

With respect to the particular data/curves illustrated by FIG. 13, in contrast to the data/curves illustrated by FIG. 12, both the standard Pearson correlation metric and the modified Pearson correlation metric will take on the same value of 1.0 when calculated in relation to each of these three data curves. Thus, the modified Pearson correlation metric is not particularly advantageous relative to the standard Pearson correlation metric in allowing for distinctions to be made among the gesture data curves 1306, 1308, and 1310. Nevertheless, peak-to-peak metrics will vary depending upon which of the gesture data curves 1306, 1308, and 1310 is compared to the linear curve 1302, and thus the peak-to-peak metrics can still be used to distinguish among the curves 1306, 1308, and 1310.

Figure 14:
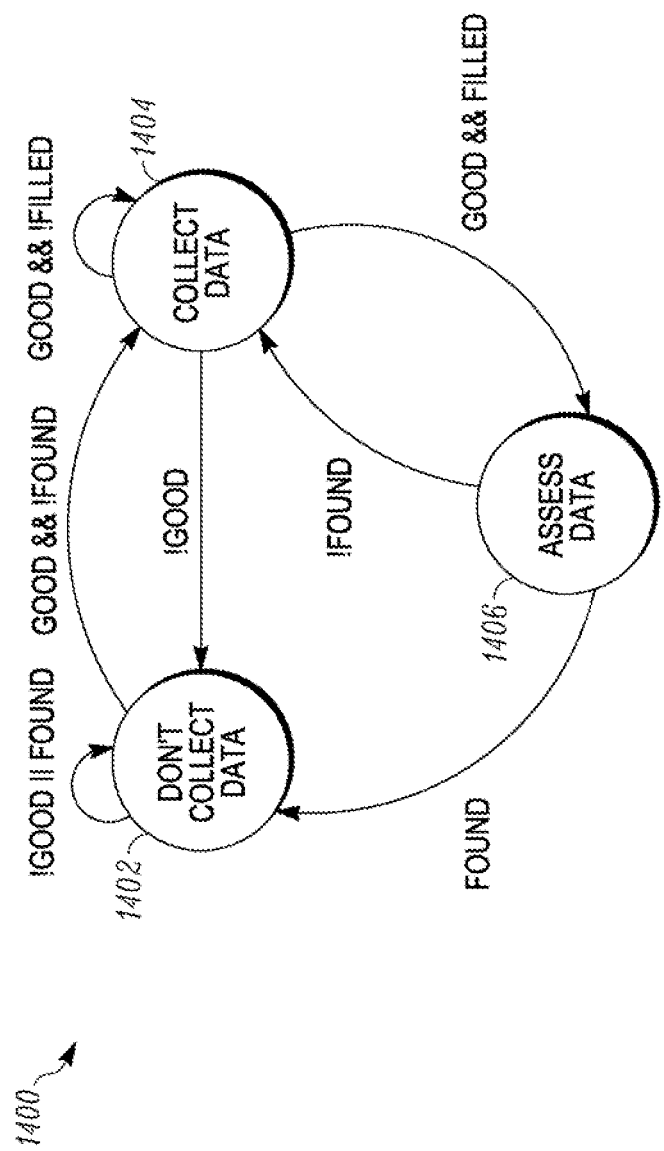
FIG. 14 is a state diagram illustrating example states of operation (and transitions between those states) of the electronic device of FIG. 1 as it performs gesture recognition.
Figure 15:
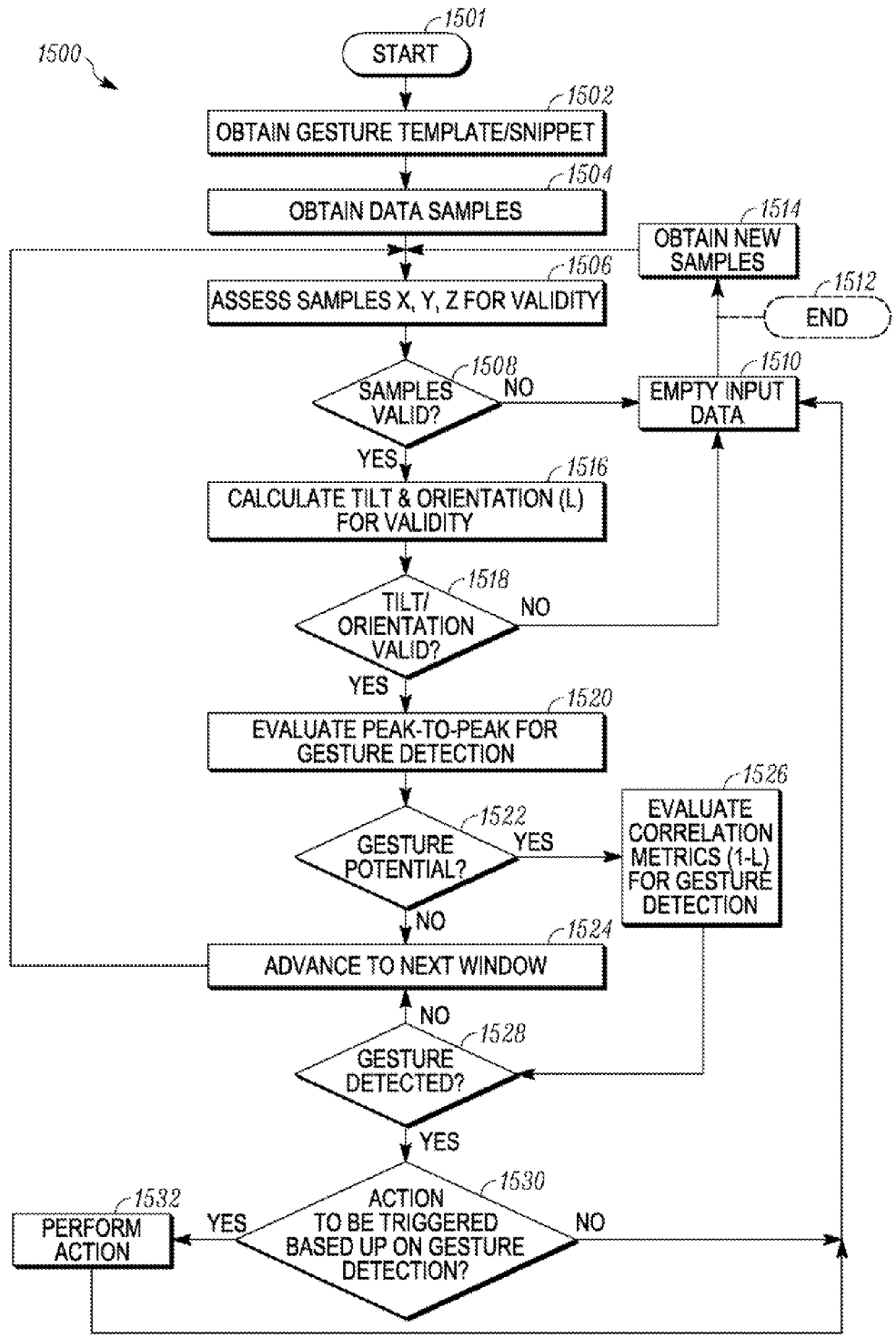
FIG. 15 is a flow chart showing example steps of operation of the electronic device of FIG. 1 in performing gesture recognition.

Again referring particularly to FIGS. 14 and 15, in the present embodiment the electronic device 100 (and particularly the processor 204) operates in accordance with a state diagram (or state machine) 1400 and in accordance with a flow chart 1500 as it operates to recognize gestures, after the electronic device has been provided with gesture template(s) or sampled data suitable for allowing the electronic device itself to generate such gesture template(s). That is, upon the process represented by the flow chart 1500 starting at a step 1501, at a step 1502 the electronic device 100 obtains one or more appropriate gesture template(s) and then is able to operate in accordance with the state diagram 1400 of FIG. 14 as well as in accordance with the remaining steps of the flow chart 1500. Operation in accordance with the state machine particularly not only allows for control over algorithmic operations, but also allows for reduction in the algorithmic operations.

Particularly with respect to the state diagram 1400, it will be noted that the state diagram includes three states, namely, a "Don't Collect Data" state 1402, a "Collect Data" state 1404, and an "Assess Data" state 1406. The Don't Collect Data state is one in which the electronic device 100 clears collected data and checks raw data to determine if position is good. The Collect Data state 1404 is one in which the electronic device 100 checks raw data to determine if position is good and collects sample(s) in a sliding window. The sliding window typically is a window W of samples where, over time, earliest-received ones of the samples are discarded and new samples are added to the window, in a first-in, first-out (FIFO) manner. The Assess Data state 1406 is one in which the electronic device 100 produces and checks correlation and p2p metrics to determine if a gesture has been detected or "found".

Further as shown, the electronic device 100 remains within the particular states 1402, 1404, and 1406, or switches between the states, based upon the status of three conditions, namely, a "good" condition, a "filled" condition, and a "found" condition. The good condition is a condition signifying that the current detected position of the electronic device 100 (and thus the position of the wrist of the lower arm 102) is either suitable for a given gesture type to occur or, even if currently unsuitable for the given gesture type to occur, has only been unsuitable ("bad") for a short time. Whether this condition is met can be determined based upon information concerning the position, tilt, and orientation of the electronic device 100 obtained from sampled data. The filled condition is a condition signifying that the sliding window of detected data has been filled with sufficient samples so as to allow correlation and p2p metrics to be calculated, and is determined based upon whether sufficient data has been sampled by way of the accelerometer 110 (and/or other sensing devices). The found condition is a condition signifying that a gesture of a given type has in fact been recognized (e.g., recently recognized or "found") based upon the comparison of the sampled gesture data with a gesture template (or snippet). Whether this condition is met is determined based upon the correlation and p2p metrics, and satisfaction of this condition is what finally constitutes recognition of a gesture.

In regard to the sampling of data during gesture detection, it should be particularly noted that, in the present embodiment, to be fully filled the window W has the same number of samples (in equation (7), "L" samples) as are used to generate the gesture template or snippet (in equation (4), also "L" samples). Also, it should be noted that the collection of samples occurring during the state 1404 occurs on an ongoing basis while the electronic device 100 is in that state, and the electronic device receives the samples typically on an ongoing basis at a rate equal to that used in determining the gesture template (e.g., at a pace of 25 Hz corresponding to the sample rate for the data used to generate the graphs of FIGS. 6, 7, and 8). After a window has L samples, as further samples are obtained, earlier samples are discarded from the window (with the samples being discarded on a FIFO basis). Although it is the case in the present embodiment that the window W and snippet S have the same number of samples (L samples each, in this example), in other embodiments this need not always be the case.

As further shown by FIG. 14, in the present embodiment the electronic device 100 switches between the states 1402, 1404, and 1406 depending upon which of the conditions are true or untrue. More particularly, when the electronic device 100 is in the Don't Collect Data state 1402, the electronic device remains in that state so long as either the good condition is not met (!good) or (||) the found condition is considered to be met (!found). This is appropriate because, if the good condition is not met, then that signifies that the lower arm 102 is positioned in such a manner that it would not be possible for a gesture (or at least not a gesture in accordance with a gesture type of interest) to occur, and also because presumably only one gesture will be occurring at any given time and so, if a gesture is currently found, then it is not yet an appropriate time for trying to detect a new gesture.

Although the electronic device 100 remains in the Don't Collect Data state 1402 in the above-described circumstances, when both the good condition is met and (&&) the found condition is considered to be not met (good && !found), then the electronic device switches to the Collect Data state 1404. When in the Collect Data state 1404, the electronic device 100 remains in that state either until such time as the good condition is no longer met (!good), in which case the electronic device returns to the Don't Collect Data state 1402, or until both the good condition and the filled condition are met (good && filled). Further, so long as the electronic device 100 is in the Collect Data state 1404 and the good condition is met but the filled condition is not yet met, thus signifying that it is possible that a gesture may occur but sufficient data samples have not yet been obtained to perform gesture recognition (good && !filled), the electronic device remains in the Collect Data state 1404 and continues to obtain additional data samples to form the window W of samples.

As shown, the electronic device 100 further advances from the Collect Data state 1404 to the Assess Data state 1406 when the good condition is met and the filled condition is met (good && filled), signifying that it is possible that a gesture of interest is occurring, and that sufficient sampled data has been obtained to form a judgment that an instance of a gesture type of interest has occurred. It is at the Assess Data state 1406 that the correlation and p2p metrics are calculated based upon the particular window W of sampled data obtained during the state 1404.

Because it is often if not typically the case that the correlation and p2p metrics calculated based upon a given window W of sampled data will not be indicative of a gesture having occurred, the electronic device 100 will often, when in the Assess Data state 1406, determine that the found condition is not met and then immediately return to the Collect Data state 1404. Upon returning to the Collect Data state 1404, an additional data sample (or possibly multiple samples) can be taken to update the data sample(s) in the window W and, upon this occurring, the electronic device 100 then again returns to the Assess Data state 1406 for assessment of the new window of data samples (assuming that the good condition is still met). Thus, the electronic device 100 can cycle repeatedly back and forth between the Collect Data and Assess data states 1404, 1406, so as to repeatedly obtain and assess new gesture sample data, so long as the good condition remains met. If the occurrence of a gesture has been recognized (found) during the Assess Data state 1406, the electronic device 100 returns to the Don't Collect Data state 1402.

Referring again to FIG. 15, as already noted above, the process of operation of the electronic device 100 as represented by the flowchart 1500, upon starting at the step 1501 and receiving or obtaining gesture template/snippet information for gesture types of interest at the step 1502, then advances to analyze/process the data samples it obtains from the accelerometer 110 (or other sensing devices) in relation to the gesture template/snippet information to perform gesture recognition. Such processing/analysis is performed in accordance with the steps 1504-1532 shown in FIG. 15. It should be appreciated that the performing of these steps largely corresponds to the manner of operation represented by the state diagram 1400 of FIG. 14, albeit the processing is shown in a different manner.

As shown, upon completing the step 1502, the electronic device 100 receives 1504 data samples (x, y, z) by way of the accelerometer 110 (or other sensing device(s)), and then subsequently the electronic device 100 (or processor 204 thereof) assesses 1506 the data samples for the purpose of determining whether the currently-sensed data samples can potentially be indicative of a valid beginning of a gesture. Again, if the position of the electronic device 100 as represented by the samples indicate that the electronic device (or wrist of the lower arm 102 on which it is supported) is in a position that is inconsistent with a gesture being performed, then at a step 1508 it is determined that the samples are invalid, that is, a gesture is not possible as indicated by those particular samples, and thus the process advances from the step 1508 to a step 1510, at which all of the currently-held data samples of the window W are eliminated from the memory of the electronic device 100 (to be clear, depending upon the embodiment or circumstance, any subset of the currently-held data samples can be considered in relation to the steps 1506, 1508 and/or eliminated at the step 1510). Upon performing of the step 1510, the process can be considered to end at a step 1512 or, alternatively as shown, the process can begin anew by proceeding to a step 1514 at which new data samples are obtained, after which the process returns to the step 1506.

Further with respect to FIG. 15, if at the step 1508 it is instead determined that the samples are valid, then the process instead advances to a step 1516, at which the electronic device 100 calculates tilt and orientation of the electronic device 100 (and thus the wrist of the lower arm 102 on which it is supported) to further determine whether it is possible that the data samples are indicative of a valid gesture occurring. Any or all (in the present embodiment, all) of the received samples of the window W (e.g., L samples), are used for this purpose at the step 1516. Then, if it is determined at a step 1518 that the calculated tilt and/or orientation is/are inconsistent with a valid gesture, then the process again return to the step 1510 and ultimately the step 1512 or 1514 (again, as with the steps 1506, 1508, and 1510, depending upon the embodiment or circumstance, any subset of the currently-held data samples can be considered in relation to the steps 1516, 1518 and/or eliminated at the step 1510). Alternatively, if at the step 1518 it is determined that the tilt and orientation values that have been calculated are consistent with a gesture of interest occurring, then the process instead proceeds from the step 1518 to a step 1520.

Step 1520 is the first of several steps performed for the purpose of determining whether received data samples should be recognized in fact as a gesture instance of a gesture type of interest. As shown, at the step 1520, the electronic device 100 first evaluates (that is, calculates and evaluates) the peak-to-peak sample data values, that is, the peak-to-peak metric ($M_{p2p}$). If it is determined at a step 1522 that the determined peak-to-peak metric is indicative of the occurrence of a gesture of a gesture type of interest, then the process advances to a step 1526, at which additionally the electronic device 100 further calculates and evaluates the correlation metrics for the purpose of gesture detection. As already discussed, the correlation metric that is particularly determined in the present embodiment is that shown in equation (10) above. That is, the correlation metric ($M_{corr}$) is calculated with respect to all of the L sample data values (that is, the samples 1-L).

If as a result of the evaluation of the step 1526 a gesture is not detected, then the process proceeds to a step 1524, which is also the step that is arrived at if at step 1522 it is determined that there is no potential for a gesture. Upon reaching the step 1524, the process advances to the next window W. That is, one (or potentially more than one) of the data samples within the window W is eliminated and the electronic device 100 receives a new data sample (or samples) from the accelerometer 110 (or other sensing device(s)) to update the window W. Thus the step 1524 is similar (if not identical) to the step 1514 in that both steps involve discarding old sample data and adding new sample data. It should be noted further in this regard that, although in some embodiments only a single data sample is eliminated (e.g., during FIFO operation, with values in the window being contiguous samples), in other embodiments more than one data sample can be eliminated. To be clear, although in some embodiments or circumstances it can be appropriate to consider a "data sample" as referring to only a single portion of data corresponding to only single input (e.g., x input, y input, or z input, but not two or more of these in combination), with respect to the present discussion concerning the elimination of a single data sample from the window during FIFO operation, each data sample should be understood to include an array of three portions of data corresponding to multiple (e.g., three) inputs (e.g., x, y and z). Thus, in the present discussion, elimination of a data sample from the window refers to elimination of all of the x, y, and z values that were obtained at the same time.

After completion of the step 1524, the process returns to the step 1506 and assessment of the samples at that step begins again. It should be noted that, in the present embodiment, for as long as sampling is going on (with oldest data samples removed and newest data samples inserted in a FIFO manner), the sampling can proceed at a certain sampling rate (e.g., 25 Hz) that, in the present embodiment, is the same rate at which samples were obtained for use in determining the gesture template. Also, as sampling is going on, the correlation and peak-to-peak metrics can be calculated/recalculated also at this same sampling rate in relation to each new/revised window of samples. Again, in the present embodiment, the gesture template S has the same number of samples, L samples, as the window W. That said, it is not necessary in all embodiments or implementations that the sampling rate for the gesture template/snippet be the same as the gesture data sampling rate. Rather, in some alternate embodiments, even though the sampling rates for the gesture template and gesture data sampling are not the same, decimation can be used to make them align before correlation is performed. For example, if a gesture template/ snippet is described as being sampled at 25 Hz and an incoming data stream is sampled at 50 Hz, correlation (and, ultimately gesture recognition) between the gesture template and the gesture data samples can still be achieved following decimation of the gesture data sample information by a factor of 2.

The evaluation performed by the electronic device 100 at the step 1526 as to whether a gesture has occurred, based upon calculated p2p and correlation metrics, can take a variety of forms depending upon the embodiment or circumstance, some examples of which are discussed further below. If based upon this evaluation at the step 1528 the electronic device 100 determines that a gesture has occurred, then the process advances to a step 1530. At the step 1530, the electronic device 100 (or processor 204 thereof) determines whether there is some action to be taken that is triggered based upon the gesture recognition or detection. In some cases, no action will be taken, and in such cases upon completion of the step 1530 the process returns to the step 1510 in which all of the sampled data of the window is discarded and the process can then end at the step 1512 or return to the step 1514. Alternatively, and typically, the electronic device 100 at the step 1530 determines that one or more actions are to be triggered based upon the recognized gesture and, if such is the case, then the electronic device 100 proceeds to a step 1532 at which the electronic device, or the processor 204 thereof, or one or more other ones of the internal components 200 thereof (or potentially even components or devices external or separate and distinct from the electronic device 100) perform those action(s). Actions can include haptic, audio, or visual feedback indicating that the electronic device 100 has registered a gesture as well launching of an application. Upon completion of the performing of the actions at the step 1532 (or at least triggering of those actions to occur), the process also returns to the step 1510 and subsequently proceeds to either the step 1512 or the step 1514 (after which the process can again proceed with the step 1506).

It should be appreciated that the particular action or actions that can be triggered by gesture recognition can encompass any of a wide variety of actions. For example, in some cases, the electronic device 100 can record that a gesture has occurred in its memory portion 206 or provide an output signal indicative of its recognition of that gesture, for example, by way of one or more of the output devices 208. Such stored or output information can also include related data, such as the time at which the gesture occurred. Also, upon gesture recognition, the electronic device 100 can provide an output signal by way of some other mechanism such as by way of one of the wireless transceivers 202 or the component interface 212.

Also for example, the triggered action can involve an action in which the electronic device 100 takes on a new state in which the electronic device is ready to receive new inputs from the user, for example, by way of the input devices 210, or ready to receive sensory inputs via the sensing devices 228, or signals from external devices such as by way of the wireless transceivers 202 or the component interface 212. Further, in some circumstances, the triggered action can involve taking an action to shut down the electronic device 100 to reduce power usage or take some other processing or control action. Also, the action(s) that are triggered can vary depending upon the circumstances, such as user context, cloud computing based context, etc. Indeed, the actions that can be triggered in response to particular detection of gestures can take on numerous forms depending upon the embodiment or context.

Although FIG. 15 provides a general description of an example process for gesture detection, it should be appreciated that many variations of the general process represented by FIG. 15 are possible depending upon the embodiment or implementation. For example, even though the above discussion concerning FIG. 15 envisions that all of the samples are discarded at the step 1510, in other embodiments it is possible that only some samples are discarded or that samples are discarded in a particular manner. For example, in at least some embodiments the oldest value is discarded when taking in a new value (i.e., typical FIFO operation). Also, in some embodiments, even if a new value is considered "bad", the "bad" value still can be kept and stored in the FIFO arrangement of data in the window (that is, the process may avoid discarding the "bad" data) if the received data in combination with earlier-received data suggest that the device position has not been "bad" for a long enough period of time as to justify discarding of the data. In the above description, it is assumed that the values in the window are contiguous with respect to a sampling rate that matches the sampling rate of the gesture template.

Indeed, in some cases, the assessment of samples performed at the step 1506 can result in a conclusion that, even though overall one or more of the samples demonstrate invalidity at the step 1508, one (or possibly more) of the sample data values are "good" or acceptable. In some such cases, rather than having all of the samples being discarded at the step 1510 due to partial invalidity, instead the gesture detection process can proceed (e.g., proceed to the step 1520) with the partly-invalid data. Alternatively, in some cases it is possible that only certain one(s) being invalid data samples will be discarded while other data samples (potentially ones that are valid or even one or more that are invalid) are kept. For example, if one "good" sample was determined to be present at the step 1506, then at the step 1510, for example, four other samples could be discarded and then at the step 1514 four new samples could be taken, even while the "good" sample was kept. Then (repeating), if one of those 4 new samples is "good", there will be at least 4 more samples taken after the second "good" sample.

In this regard, it should be noted that, typically, it is desirable for all of the data samples stored in the window to be data samples that were received in a contiguous manner (that is, each successive data sample in the window corresponds to data received at a successive time, where the time elapsed between each successive sample and the previous sample is the same in accordance with the data sampling rate). Nevertheless, in at least some circumstances in which data samples are discarded as discussed above, it is possible that the time elapsed between each successive sample in the window will not be the same.

It should further noted that, more generally, various embodiments of gesture detection processes in which different sample data can be discarded in selective manners (even though other sample data is kept and not discarded) can be advantageous in that such manners of operation can allow certain of the samples to be "bad" without requiring transition to a "Don't Collect Data" state as discussed above in relation to FIG. 14. Further, this can provide a "fuzzy" mechanism for allowing intermittent "noise" and avoiding a strict requirement that all the samples be captured while the electronic device 100 is stationary, for the purpose of accurately detecting tilt or orientation values (which might otherwise be perturbed by motion) or otherwise. That is, when tilt and orientation values are being detected for determining gesture validity, values within loose range(s) can be accepted to allow for perturbations (and to allow for the fact that, in many cases, gestures of interest will lack portions of the gesture that are stationary).

Still referring to the gesture detection process of FIG. 15, yet one additional example gesture detection process generally in accordance with FIG. 15 and requiring the collecting of L contiguous sets of (x,y,z) data samples (values to fill the window of data samples) proceeds as follows. Upon commencement of the process, a first set of data samples (x,y,z) is received, and that set is assessed for compatibility with the gesture, in terms of position, tilt, and orientation (e.g., corresponding to the steps 1508 and 1510 of FIG. 15). If that first set of data is determined to be "good", the set is saved in the window; otherwise, that set is tossed out and a new data sample is obtained. Eventually, upon receipt of an initial "good" data sample set (x,y,z), that data sample set is stored as the first set (set 1) of the sample data stored in the window. Subsequently, additional data sample sets are collected. As each new data sample set is received, it is assessed for compatibility/validity, again in terms of position, tilt, and orientation.

Further in this present example, assuming that a first set of data samples is received and that is deemed valid or "good", subsequent sets of data samples will also be added to the window even if those data samples are "bad" so long as five (5) consecutive sets of the "bad" (invalid/incompatible) data samples are not received. Alternatively, if five "bad" data sample sets are received in a row, the gesture detection process will discard all of the data samples from the window and start the process over again. That is, if five "bad" data sample sets are ever received in a row, then the whole window of sampled data (all of the data stored in the FIFO manner) is cleared and detection restarts (and a first new data sample is not accepted into a new window until a first "good" data sample set is received). However, even one or more "bad" data sample sets are obtained, if five such sets are never obtained in a row, then these "bad" data sample sets are kept stored in the window (and are stored in the FIFO manner).

Eventually, as a result of the ongoing sampling of data, the window becomes filled with sampled data, particularly with data sets 1 through L, which are stored in the FIFO manner. At this point, then the peak-to-peak and correlation metrics are calculated and assessed to perform gesture detection (e.g., steps corresponding to the steps 1520, 1522, 1526, and 1528 of FIG. 15). If a gesture is detected, all of the data in the window is cleared and the gesture detection process begins anew. However, if a gesture is not detected based upon the assessment of metrics, then only one of the data sample sets is removed and only one new data sample set is obtained and considered. Particularly in the present embodiment, where the data sample sets are stored in the window in the FIFO manner, although it is particularly the first set of sample data (set 1) that is removed in this case, the new data sample set that is collected does not take the place of the first set in the window but rather is entered as the last data set (set (L+1)).

As already mentioned above, in this example embodiment, the process of replacing data sets is subject to the rule discussed above in which, if five "bad" data sample sets are received in a row, then all of the data sample sets of the window are entirely cleared and the obtaining of data sample starts entirely over. Thus, in the above-mentioned circumstance where the existing window of data samples is not indicative of a gesture and so the first data sample set is discarded and the new (L+1) data sample set is received, the process considers whether this new data set in combination with each of the preceding four data sets is "bad" (e.g., whether each of the data sets L+1, L, L−1, L−2, and L−3 is "bad"). If so, then all of the data sample sets are cleared from the window but, if not, then the window now holds a full window of data (e.g., given the discarding of data set 1, the window would then include data sets 2 through L+1) and, with this window of data, the metrics can again be calculated and checked for gesture detection.

In addition to the above discussion, it should further be appreciated that the particular values of the peak-to-peak and correlation metrics (and/or possibly other metrics as well) interpreted as signifying the occurrences of gestures can vary widely based upon a variety of factors, including for example the embodiment, the type of electronic device, the type(s) of accelerometer(s) and/or other sensing device(s) used to sense position/movement data, whether there are other forms of information used to perform the gesture recognition in addition to the position/movement data, the type(s) of gestures being detected, and the degree to which it is desired that ambiguous movements will be recognized as particular gestures or not. Also, depending upon such factors, only some available metrics may be considered and others need not be considered. For example, in one circumstance the peak-to-peak metric associated with x-axis movement may be of significance in gesture recognition but the peak-to-peak metric associated with y-axis movement may not be of any significance to the gesture recognition, but in another circumstance each of these peak-to-peak metrics may be of significance.

Notwithstanding the high degree of variability that is possible in this regard, in one example embodiment in which fist bump gestures are to be detected, the following particular criteria can be used for gesture recognition:

(a) In determining the starting position validity (the determination made at the step 1508 of FIG. 15), it is necessary that abs(tilt)<35 and abs(abs(orientation−90)>60) in order for the position of the electronic device 100 to be considered to be valid for the possible occurrence of a fist bump gesture;

(b) In determining the tilt/orientation validity (the determination made at the step 1518 of FIG. 15), it is necessary to have tilt>35 (ideally near 90, but motion perturbs the value and so a larger allowance can be required) in order for the tilt/orientation of the electronic device 100 to be considered to be valid for the possible occurrence of a fist bump gesture;

(c) In determining whether detected movement is considered to be a fist bump gesture, both peak-to-peak metrics and correlation metrics are considered. With respect to the peak-to-peak metrics (the determination made at steps 1520, 1522 of FIG. 15), the x-axis peak-to-peak metric (x_p2p) needs to be >0.6G (needs to be high enough to show proper motion), and the y-axis peak-to-peak metric (y_p2p) needs to be <2G (1G is expected based on twist, larger than 2G is too large). However, the z-axis peak-to-peak metric is not considered in determining whether the fist bump gesture has occurred.

(d) Further, with respect to the correlation metrics (the determination made at steps 1526, 1528 of FIG. 15), only the y-axis correlation metric (y_corr) needs to be considered, and specifically y_corr should be >0.85 (high enough to show pattern matching). Assuming each of the aforementioned peak-to-peak and correlation metrics are satisfied, the detected movement is recognized to constitute an instance of the fist bump gesture type.

Thus, in this example, x-axis motion is of significance to the gesture determination in terms of its effect on the x-axis peak-to-peak metric, but is not of significance in terms of the correlation metric. Also, although the y-axis movement is taken into account both in terms of the peak-to-peak and the correlation metrics, its effect upon the correlation metric is of greater significance with respect to the overall gesture determination. Further, in this example, beyond the tilt determination and y-axis metrics, z-axis movement adds no value to the gesture determination. Additionally, given the high significance of the y-axis movement to the correlation metrics, relative lesser importance of y-axis movement to the peak-to-peak metrics, and the high significance of the x-axis movement to the peak-to-peak metrics, it is possible to develop simplified metrics for recognizing the fist bump gesture, for example, as represented by the following equation:

$$y\_corr+(x\_p2p/2G)>1.25 \quad (18)$$

Given such an equation, it should be understood that if y_corr>0.85 and x_p2p>0.8G, then the fist bump gesture is recognized, and also that if y_corr>0.95 and x_p2p>0.6G, then the fist bump gesture is also recognized. Further, the combination of y_corr and x_p2p in this manner shows that higher confidence in y_corr correspondingly allows for recognition of the fist bump gesture notwithstanding lower x_p2p, and that lower confidence in y_corr correspondingly requires higher confidence in x_p2p. It additionally should be noted that this combination of y_corr and x_p2p can be scaled to reflect the score or estimated likelihood that the gesture occurred.

The above-described fist bump gesture example generally illustrates important aspects regarding how a gesture template is measured and formed along with how the metrics are interpreted and used for gesture recognition. In this fist bump gesture example, and in accordance with the flow chart 1500 of FIG. 15, starting position is monitored and unnecessary computations are prevented when the starting position requirements are not met. Also, an ending position metric is used. Features along the x axis allow simpler processing (just p2p tracking), and features along the y axis are fully utilized (correlation and p2p), but features along the z axis are unimportant with respect to the above metrics. Additionally as discussed, metrics can be combined (again as shown in the above example involving linear combination of y_corr and x_p2p).

Further, in another example embodiment in which handwave gestures are to be detected, the following criteria can be used for gesture recognition:

(a) To begin, starting position and tilt/orientation are monitored to determine whether a valid gesture can be occurring at this time (the determinations made at the steps 1508 and 1518 of FIG. 15), so that unnecessary computations are prevented when the starting position requirements are not met. With respect to the handwave gesture, for validity to be determined in this embodiment, abs(tilt)>35 and abs(abs(orientation−90)>60).

(b) Additionally, to determine whether a handwave gesture has occurred, correlation metrics for each axis are calculated (at the step 1526). In the case of a handwave gesture, the most movement is on the y-axis, and so to determine that a handwave gesture has occurred, the correlation metric on the y-axis should exceed a threshold and the sum of all three correlation metrics (x, y, z) also should exceed a threshold. In contrast to the manner of recognizing the fist bump gesture described above, and although further testing and optimization may lead to including comparing peak-to-peak metrics to thresholds, in the present embodiment, peak-to-peak metrics are not evaluated to determine whether a handwave gesture has occurred.

Additionally, in another example embodiment in which handshake gestures are to be detected, the following criteria can be used for gesture recognition:

(a) To begin, starting position and tilt/orientation are monitored to determine whether a valid gesture can be occurring at this time (the determinations made at the steps 1508 and 1518 of FIG. 15), so that unnecessary computations are prevented when the starting position requirements are not met. With respect to the handshake gesture, for validity to be determined in this embodiment, abs(tilt)>35 and abs(abs(orientation−90)<30).

(b) Additionally, to determine whether a handshake gesture has occurred, correlation metrics for each axis (x, y, z) are calculated (the calculations made at the step 1526). In particular, the correlation on the y-axis should exceed a threshold, and also the sum of all three correlation metrics (for each axis) should exceed a threshold.

(c) Further, to determine whether a handshake gesture has occurred, p2p metrics are also calculated for each axis. For detection, the p2p metric for the y-axis should exceed fractions of the other p2p metrics, and the p2p metric for the y-axis should exceed 2G.

Notwithstanding the particular description provided above, the present disclosure is intended to encompass numerous additional variations. For example, although the state diagram 1400 of FIG. 14 and flow chart 1500 of FIG. 15 envision that, at any given time, a particular type of gesture is being detected, in fact multiple instances of the state diagram and flow chart can be operating simultaneously for the purpose of detecting multiple or many different types of gestures simultaneously. Each gesture type can have a separate/distinct state machine pertaining thereto, and/or each gesture can have its own window size (e.g., in terms of the number of data samples L) or in terms of other characteristics. Further for example, certain of the operations discussed in regard to FIG. 15 (e.g., the steps 1508, 1518, 1522, and 1528) can involve consideration of how the detected samples, tilt/orientation values, correlation metrics, or peak-to-peak metrics are indicative of whether any instance(s) of any of multiple types of gestures have occurred and/or whether any portion(s) of sensed gesture data is/are indicative of any occurrence(s) of any instance(s) of any of multiple types of gestures.

Also, the processing that is performed in relation to the steps 1508, 1518, 1522, and 1528 in determining whether a valid gesture may possibly have occurred, and/or whether an instance of a given type of gesture in fact has occurred, can vary considerably. For example, whether a given value of a correlation metric will be interpreted as indicative of whether an instance of a given gesture type has occurred can depend upon numerous other factors, for example, information regarding an operational context of or instruction received by the electronic device. Depending upon the circumstance, correlation or peak-to-peak metric values (or scores) calculated in relation to given gesture data can be interpreted in different manners, with scores being attributed in a variety of manners. Further, the definition of a gesture template/snippet can vary depending upon the implementation, device, circumstance of operation, etc. In some cases, the gesture template/snippet can be determined in a manner that takes into account other factors in addition to physiological patterns. For example, in some cases, gesture templates/snippets as well as criteria/metrics for recognizing gestures can be varied to reflect operational or user context information such as time of day, or whether the user had set a volume setting of the device to a particular level (which could indicate a particular use environment that might impact gesture behavior).

Embodiments of the present disclosure are applicable to numerous environments, devices, applications, and circumstances. Among other things, embodiments of the present disclosure are applicable to a variety of implementations in wearable products, products used in relation to a variety of body locations, products employing numerous different types of sensors, and products configured to sense numerous different types of gestures. Detection of gestures can partly depend upon, and/or used in connection with, knowledge about the user's context (e.g., user's location and/or cloud computing based context) and can be an immediate and natural way to initiate and activate numerous different types of functionality in the device with respect to which the gestures are being sensed, or even in other devices that are in communication with the device with respect to which the gestures are being sensed.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of recognizing spatial gestures of an electronic device, the method comprising:

obtaining a gesture template that includes movement data representative of a particular gesture type;

obtaining, by one or more processors of the electronic device and from a motion sensing component of the electronic device, motion data indicative of motion of the electronic device;

calculating, by the one or more processors, a correlation metric based at least part on a mean value of the movement data of the gesture template, a variance of the movement data of the gesture template that is based in part on the mean value of the movement data of the gesture template, the motion data, and the gesture template;

determining, based at least in part on the correlation metric, that a gesture of the particular gesture type has occurred, and performing, in response to determining that the gesture of the particular gesture type has occurred, at least one action.

2. The method of claim 1, wherein the movement data for the particular gesture type includes a first number of values and the gesture data includes a second number of values.

3. The method of claim 2, wherein the first number equals the second number.

4. The method of claim 1, wherein the correlation metric is calculated based at least in part on a modified variance of the motion data and a modified covariance of the motion data, wherein each of the modified variance and modified covariance is calculated at least in part based on the mean value.

5. The method of claim 4, wherein the correlation metric ($M_{corr}$) is calculated based on the following equation:

$$M_{corr} = \hat{\rho}_{s,w} = \frac{\hat{\sigma}_{s,w}}{\sigma_s \hat{\sigma}_w}$$

wherein each of $M_{corr}$ and $\hat{\rho}_{s,w}$ is representative of the correlation metric, $\hat{\sigma}_{s,w}$ is representative of the modified covariance of the motion data, $\hat{\sigma}_w$ is representative of a standard deviation of the motion data that is equal to the square root of the modified variance of the motion data, and $\sigma_s$ is representative of an additional standard deviation that is equal to the square root of the variance of the movement data of the gesture template.

6. The method of claim 1, wherein the determination that the gesture has occurred is further based on a peak-to-peak metric of the motion data.

7. The method of claim 6, further comprising:
determining, based at least in part on the motion data, that the motion data is appropriate for an occurrence of a gesture of the particular gesture type.

8. The method of claim 7, wherein determining that the motion data is appropriate for the occurrence of a gesture of the particular gesture type is further based on one or more of a position of the electronic device, a tilt of the electronic device, or an orientation of the electronic device as indicated by at least some of the motion data.

9. The method of claim 1, further comprising:
responsive to determining that the motion data is inconsistent with a gesture type of the particular gesture, discarding an old value included in the motion data and obtaining a new value to so as to update the motion data.

10. The method of claim 1, wherein the electronic device is a wearable mobile device, and wherein the at least one action includes outputting a signal by way of an output device of the wearable mobile device.

11. A method of recognizing gestures, the method comprising:
obtaining a gesture template that includes movement data representative of a particular gesture type;
determining, by one or more processors of a mobile device, that a status of the mobile device is appropriate for an occurrence of a gesture of the particular gesture type based on one or more of a detected position of the mobile device, a detected tilt of the mobile device, and a detected orientation of the mobile device;
responsive to determining that the status is appropriate for the occurrence of a gesture of the particular gesture type, obtaining, by the one or more processors and from an accelerometer of the mobile device, motion data;
determining, by the one or more processors, that the motion data includes a sufficient number of samples to allow for recognition of a gesture of the particular gesture type;
calculating, by the one or more processors, a correlation metric based at least on the motion data and the gesture template; and
responsive to determining, based at least in part on the correlation metric, that a gesture of the particular gesture type has occurred taking at least one action.

12. The method of claim 11, wherein determining the correlation metric comprises:
determining the correlation metric based at least on the motion data, the gesture template, a mean value of the movement data of the gesture template, and a variance of the movement data of the gesture template that is based in part on the mean value of the movement data of the gesture template.

13. The method of claim 12, wherein the determining that the gesture of the particular gesture type has occurred is further based at least in part on a peak-to-peak metric of the motion data.

14. The method of claim 12, wherein the correlation metric ($M_{corr}$) is calculated based on the following equation:

$$M_{corr} = \hat{\rho}_{s,w} = \frac{\hat{\sigma}_{s,w}}{\sigma_s \hat{\sigma}_w}$$

wherein each of $M_{corr}$ and $\hat{\rho}_{s,w}$ is representative of the correlation metric, $\hat{\sigma}_{s,w}$ is representative of a modified covariance of the motion data, $\hat{\sigma}_w$ is representative of a standard deviation of the motion data that is equal to the square root of a modified variance of the motion data, and $\sigma_s$ is representative of an additional standard deviation that is equal to the square root of the variance of the movement data of the gesture template.

15. The method of claim 12, wherein the calculating of the correlation metric is not based on a mean value determined based on the motion data.

16. A mobile device comprising:
a motion sensing component configured to generate motion data indicative of motion of the mobile device;
at least one memory device configured to store a gesture template that includes movement data representative of a particular gesture type;
at least one processing device coupled to the motion sensing component and the memory device, wherein the processing device is configured to:
calculate a correlation metric based at least in part on the motion data, the gesture template, and a mean value of the movement data of the gesture template, and a variance of the movement data of the gesture template that is based in part on the mean value of the movement data of the gesture template;
determine, based at least in part on the correlation metric, that a gesture of the particular gesture type has occurred; and
perform, in response to determining that the gesture of the particular gesture type has occurred, at least one action.

17. The mobile device of claim 16, wherein the motion sensing component includes one or more of an accelerometer, a gyroscope, and a barometer.

18. The mobile device of claim 16, wherein the at least one processing device is further configured to:
calculate a peak-to-peak metric of the motion data, and
determine that the gesture of the particular gesture type has occurred further based at least in part on the peak-to-peak metric of the motion data.

19. The mobile device of claim 16, wherein the at least one processing device operates in accordance with a state machine having a first state that involves not collecting the motion data, a second state that does involve collecting the motion data, and a third state that involves assessing the motion data, wherein the assessing includes the calculating of the correlation metric.

20. The mobile device of claim 16, wherein the at least one processing device is further configured to:
determine that a status of the mobile device is appropriate for an occurrence of a gesture of the particular gesture type based on one or more of a detected position of the mobile device, a detected tilt of the mobile device, and a detected orientation of the mobile device; and
calculate the correlation metric in response to determining that the status is appropriate for the occurrence of a gesture of the particular gesture type.

* * * * *

UNITED STATES PATENT AND TRADEMARK OFFICE
CERTIFICATE OF CORRECTION

PATENT NO. : 9,442,570 B2
APPLICATION NO. : 13/800743
DATED : September 13, 2016
INVENTOR(S) : Andrew M. Slonneger Page 1 of 1

It is certified that error appears in the above-identified patent and that said Letters Patent is hereby corrected as shown below:

In the Claims

Column 29, Line 14 (Claim 9): "value to so as to" should read --value so as to--

Signed and Sealed this
Eleventh Day of April, 2017

Michelle K. Lee
*Director of the United States Patent and Trademark Office*